US012169737B1

(12) United States Patent
Moore

(10) Patent No.: US 12,169,737 B1
(45) Date of Patent: Dec. 17, 2024

(54) TASK ORCHESTRATION SYSTEM IN A TRUSTLESS COMPUTING ENVIRONMENT

(71) Applicant: Installmt LLC, Greenville, SC (US)

(72) Inventor: David Asbury Moore, Greenville, SC (US)

(73) Assignee: INSTALLMT LLC, Greenville, SC (US)

( * ) Notice: Subject to any disclaimer, the term of this patent is extended or adjusted under 35 U.S.C. 154(b) by 0 days.

(21) Appl. No.: 18/534,197

(22) Filed: Dec. 8, 2023

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS 10,331,483 B1 * 6/2019 Warman ................ G06F 9/4887
10,949,252 B1 * 3/2021 Krishnamurthy ..... G06F 9/4881

OTHER PUBLICATIONS

Zheng; Dynamic Adaptation of DAGs with Uncertain Execution Times in Heterogeneous Computing Systems, IEEE 2010 (Year: 2010).*
Neron et al; Search tree based approaches for parallel machine scheduling, Elsevier Ltd, 2006 (Year: 2006).*
Vakhania; A binary search algorithm for a special case of minimizing the lateness on a single machine; International Journal of Applied Mathematics and Informatics, 2009 (Year: 2009).*

* cited by examiner

*Primary Examiner* — Bing Zhao
(74) *Attorney, Agent, or Firm* — Dority & Manning, P.A.

(57) ABSTRACT

An example computer-implemented method is provided that includes: determining a remote computing system associated with a task queue comprising a plurality of processing tasks, wherein the remote computing system updates, based on a hidden schedule, prerequisites for the plurality of processing tasks; initiating the plurality of processing tasks according to a test task schedule constructed to probe the hidden schedule of the remote computing system; receiving a plurality of responses respectively for the plurality of processing tasks, wherein a respective response corresponds to at least one of a success indicator or a failure indicator; estimating, based on the plurality of responses, a prerequisite processing time of the hidden schedule; and generating, based on the estimated prerequisite processing time, a main task schedule for the task queue.

21 Claims, 11 Drawing Sheets

TASK ORCHESTRATION SYSTEM IN A TRUSTLESS COMPUTING ENVIRONMENT

FIELD

The present disclosure generally relates to task scheduling. More specifically, the present disclosure provides techniques for monitoring upstream computations for scheduling tasks.

BACKGROUND

Computing systems can perform processing tasks that rely on prerequisite tasks being completed. The processing tasks can fail if the prerequisites are not yet satisfied.

The timing of prerequisite completion or availability can be subject to the control of external systems that can operate on independent time schedules. Such schedules can be hidden, unknown, or lack centralized or consistent control.

SUMMARY

Aspects and advantages of embodiments of the present disclosure will be set forth in part in the following description, or can be learned from the description, or can be learned through practice of the embodiments.

One example aspect of the present disclosure is directed to an example computer-implemented method for monitoring upstream computations. The example method can include determining a remote computing system associated with a task queue comprising a plurality of processing tasks. The remote computing system can update, based on a hidden schedule, prerequisites for the plurality of processing tasks. The example method can include initiating the plurality of processing tasks according to a test task schedule constructed to probe the hidden schedule of the remote computing system. The example method can include receiving a plurality of responses respectively for the plurality of processing tasks. A respective response can correspond to at least one of a success indicator or a failure indicator. The example method can include estimating, based on the plurality of responses, a prerequisite processing time of the hidden schedule. The example method can include generating, based on the estimated prerequisite processing time, a main task schedule for the task queue.

In some implementations of the example method, initiating the plurality of processing tasks can include generating one or more test batches including one or more processing tasks. In some implementations of the example method, initiating the plurality of processing tasks can include associating each test batch of the one or more test batches with a corresponding batch time for initiating the test batch. In some implementations of the example method, initiating the plurality of processing tasks can include submitting, to the remote computing system, one or more of the test batches to be processed at the respectively corresponding batch times.

In some implementations of the example method, the corresponding batch time can be a relative batch time determined with respect to a reference time associated with the one or more processing tasks in the respective test batch.

In some implementations of the example method, estimating the prerequisite processing time can include determining a first value of the test task schedule that is associated with a failure condition. In some implementations of the example method, estimating the prerequisite processing time can include determining a second value of the test task schedule that is associated with a success condition. In some implementations of the example method, estimating the prerequisite processing time can include estimating the prerequisite processing time to be within an interval with a lower bound value based on the first value and an upper bound value based on the second value.

In some implementations of the example method, the test task schedule can be constructed to form a binary search tree of task processing times.

In some implementations, the example method can include, for a respective iteration of a plurality of iterations, initiating a respective batch of processing tasks at a respective batch time associated with a respective node of the binary search tree. In some implementations, the example method can include, for the respective iteration, determining, based on evaluating one or more responses received for the respective batch, a next respective batch time associated with a next respective node of the binary search tree. The next respective node can be a child of the respective node. In some implementations, the example method can include, for the respective iteration, updating at least one of the lower bound value and the upper bound value to be the respective batch time. In some implementations, the example method can include, for the respective iteration, initiating a next respective batch of client processing tasks at the next respective batch time.

In some implementations of the example method, determining the next respective batch time can include, based on determining a failure condition for the respective batch, assigning a later child node of the respective node as the next respective node. The next respective batch time can be a time associated with the later child node. In some implementations of the example method, determining the next respective batch time can include, based on determining a success condition for the respective batch, assigning an earlier child node of the respective node as the next respective node. The next respective batch time can be a time associated with the earlier child node.

In some implementations of the example method, the binary search tree can be characterized by a temporal precision defining a minimum node distance.

In some implementations of the example method, receiving the plurality of responses can include receiving, from the remote computing system, results for a respective test batch submitted at a respective batch time. In some implementations of the example method, receiving the plurality of responses can include determining, based on the results for the respective test batch, a score associated with a likelihood that the prerequisites of the client processing tasks in the respective test batch were updated before the batch time. In some implementations of the example method, receiving the plurality of responses can include at least one of: determining, based on the score being above a threshold value, that the prerequisite processing time preceded the respective batch time; or determining, based on the score being below a threshold value, that the respective batch time preceded the prerequisite processing time.

The example method can include initiating a main batch of the plurality of processing tasks at a main task time that is determined based on the upper bound value.

The example method can include, for one or more iterations, until a stopping condition, a series of operations. The series of operations can include initiating a respective plurality of processing tasks according to a respective task schedule constructed to probe the hidden schedule of the remote computing system. The series of operations can include receiving a respective plurality of responses respectively for the respective plurality of processing tasks. The series of operations can include estimating, based on a threshold number of success indicators in the respective plurality of responses, a task time for a next respective task schedule for a next iteration, the task time earlier than a preceding task time for a preceding iteration. In some implementations of the example method, the stopping condition can be based on a failure to receive the threshold number of success indicators in the respective plurality of responses for a respective iteration.

The example method can include determining that a duration since estimation of the prerequisite processing time exceeds a threshold. The example method can include re-estimating the prerequisite processing time.

In some implementations of the example method, re-estimating the prerequisite processing time can search a smaller initial interval.

One example aspect of the present disclosure is directed to an example computing system. The example computing system can include one or more processors and one or more non-transitory computer-readable media storing instructions that are executable by the one or more processors to cause the example computing system to perform operations. The operations can include any of the implementations of the example method.

One example aspect of the present disclosure is directed to one or more example non-transitory computer-readable media storing instructions that are executable by one or more processors to cause a computing system to perform operations. The operations can include any of the implementations of the example method.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which refers to the appended figures, in which.

DETAILED DESCRIPTION

Figure 1:
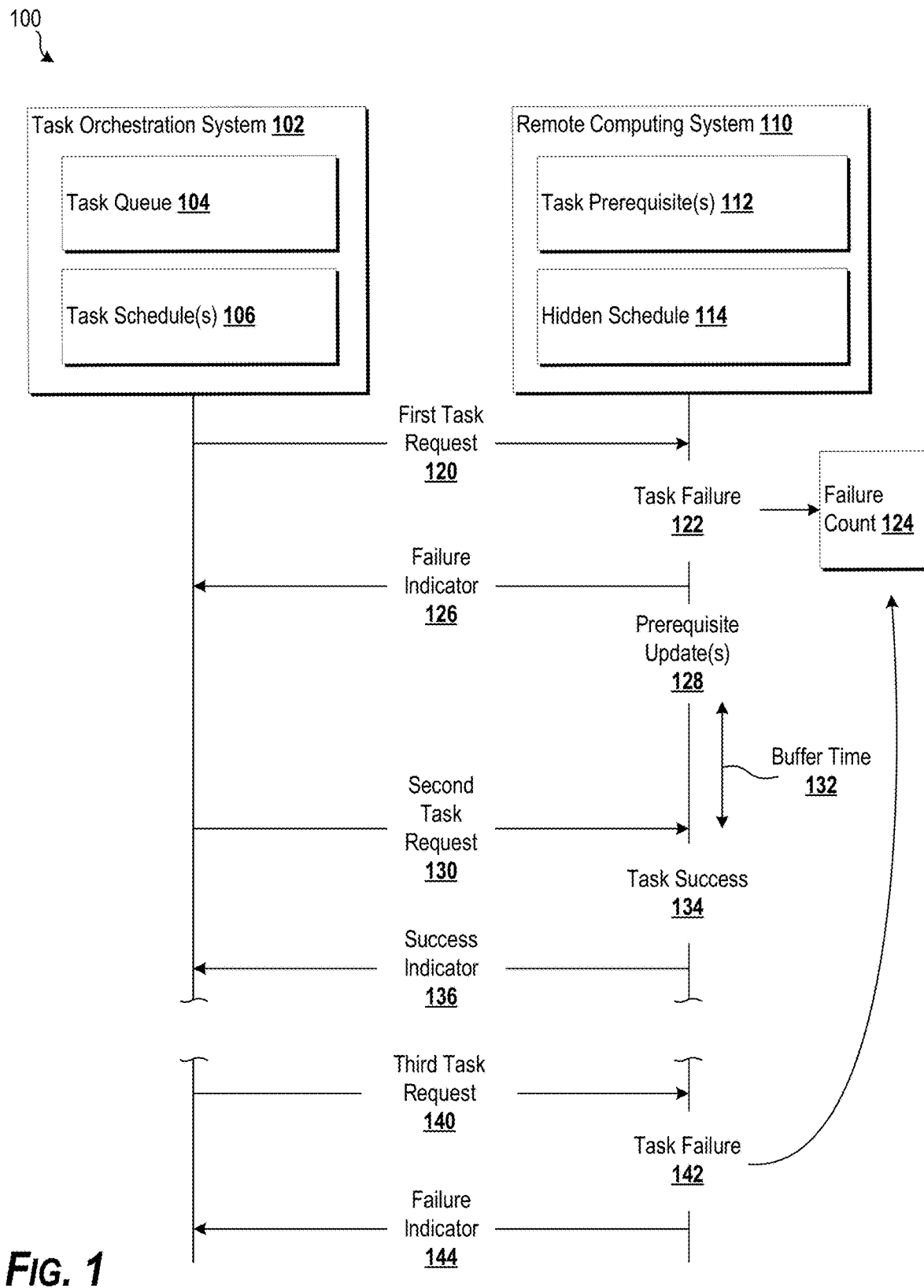
FIG. 1 is a block diagram of an example implementation of a task orchestration system according to some implementations of the present disclosure.

Example implementations of the present disclosure generally provide for monitoring performance of upstream processing events. This monitoring can occur in trustless or low-trust computing environments in which information regarding the processing events is unknown, hidden, or subject to decentralized control. For instance, an example task orchestration system can monitor availability of upstream prerequisites according to implementations of the present disclosure and initiate processes according to a task schedule that increases a likelihood of successful task completion.

For example, an example task orchestration system can monitor availability of upstream prerequisites on the remote computing system by constructing an exploratory task schedule to probe a hidden processing schedule according to which upstream prerequisites are processed, released, updated, etc. by the remote computing system. The example task orchestration system can initiate tasks on the remote computing system according to the exploratory task schedule and receive, from the remote computing system, responses that indicate failure or success of the tasks. The example task orchestration system can analyze the responses to estimate attributes of the hidden processing schedule of the remote computing system. For instance, the example task orchestration system can estimate, based on the responses, a prerequisite processing time at which prerequisites are processed, released, updated, etc. by the remote computing system.

In some processing environments, task failure can be associated with a cost or penalty. Thus, one optimization objective can be to decrease a task failure count. Some approaches to decreasing a task failure count, such as by employing overly conservative delays to await completion of prerequisite processing, can sacrifice overall performance (e.g., latency increases due to the delays). Further, some tasks can have a decaying probability of success once prerequisites are made available (e.g., due to a race condition on resources needed by the task), such that overly conservative delays can begin to increase a likelihood of task failure and thus lower the expected success rate.

For example, one or more systems can share access to a network with a data transfer cap on the shared connection. The cap can be renewed or updated on a regular basis. The one or more systems can each be associated with tasks to perform that would use part of the data allotment by uploading or downloading data across the shared connection. As time passes after the cap renewal, more and more of the data allotment can be used, decreasing an amount of available data transfer capacity. As such, the probability of a task failing due to a lack of sufficient data transfer capacity increases as time passes. Furthermore, some networks can penalize requests for data transfers in excess of the allotted capacity (e.g., with overage costs, etc.). An example task orchestration system according to the present disclosure can estimate when the prerequisite data cap is updated or refreshed and initiate tasks to execute soon thereafter to improve a likelihood of the tasks completing.

Advantageously, an example task orchestration system according to the present disclosure can optimize a runtime task schedule to improve a task success rate by estimating attribute(s) of the hidden processing schedule. The attribute(s) of the hidden processing schedule can be estimated using the exploratory task schedule. For example, an attribute of the hidden processing schedule can be a prerequisite processing time. For instance, in some systems, tasks can have a higher likelihood of success if submitted soon after a prerequisite processing time. Thus, an estimate of the prerequisite processing time can provide a target task processing time for submitting tasks to be processed by the remote computing system. By submitting tasks for processing within a threshold distance of the target task processing time, the example task orchestration system can increase the likelihood of success of the tasks by avoiding both the lack of available prerequisites and unduly long delays.

An example task orchestration system can estimate attribute(s) of the hidden processing schedule by conducting a search of a possible solution space for the attributes. The search can be a cost-efficient search that balances the cost of trial and error (e.g., the cost of initiating tasks that subsequently fail) with the potential upside of identifying attribute(s) of the hidden processing schedule that can help optimize the overall success rate.

The example task orchestration system can leverage a variety of search algorithms. Example search algorithms include linear search algorithms, tree-based search algorithms (e.g., binary tree), machine-learned search algorithms, and the like. For example, the example task orchestration system can discretize a search space. The example task orchestration system can initiate tasks at various points in the search space for a respective number of processing cycles. For instance, each processing cycle can be associated with a prerequisite processing time. Initiating tasks at different times for each cycle can reveal information regarding the prerequisite processing time for that cycle. For instance, the example task orchestration system can evaluate responses received for the tasks and determine, for the various points in the search space, whether prerequisite processing has yet occurred. Based on these determinations, the example task orchestration system can refine an estimate of the prerequisite processing time. Various different search algorithms can be used to traverse the search space in an efficient manner.

An example search algorithm can leverage a linear search. The search can traverse the range (T_MIN, T_MAX) from either direction. For instance, the example task orchestration system can start from T_MAX and progressively shift T_TEST earlier until a spike in failures occurs. The spike can indicate that T_TEST preceded the prerequisite processing time. As such, it can be estimated that the prerequisite processing time lies between the current T_TEST and the immediately preceding T_TEST. Traversing the search space linearly in reverse can enable estimating an interval surrounding the prerequisite processing time with one batch of failures. However, traversing the search space in reverse can involve waiting to try an earlier T_TEST.

Similarly, in another linear search algorithm example, the example task orchestration system can start from T_MIN and progressively shift T_TEST later until a spike in successes occurs. The spike can indicate that T_TEST followed the prerequisite processing time. As such, it can be estimated that the prerequisite processing time lies between the current T_TEST and the immediately preceding T_TEST. Traversing the search space linearly in forward time can enable estimating an interval surrounding the prerequisite processing time in one processing cycle, as subsequent T_TESTs can be tested in real time. However, traversing the search space linearly in forward time can involve repeated batches of failed tasks.

An example search algorithm can leverage a binary tree structure to efficiently identify and refine an estimated attribute value. For instance, an initial estimate of a prerequisite processing time can be bracketed within an expected range (T_MIN, T_MAX). T_MAX can be a default task processing time that is known with some threshold confidence to occur after the prerequisite processing time. T_MIN can be a lowest expected value of the prerequisite processing time. The example task orchestration system can select a test time T_TEST between T_MIN and T_MAX and submit a batch of tasks at that request time. Based on the responses received at that request time, the example task orchestration system can estimate whether the prerequisite processing time occurred prior to T_TEST. In this manner, for instance, T_TEST can divide the range (T_MIN, T_MAX) and exclude a region in which the prerequisite processing time is not expected to occur. For instance, if the task orchestration system determines that the prerequisite processing time likely occurred before T_TEST, then the next round of search in the next processing cycle can focus on the range (T_MIN, T_TEST) from which a new value of T_TEST can be selected (e.g., the midpoint). If the task orchestration system determines that the prerequisite processing time had not likely occurred before T_TEST, then the next round of search in the next processing cycle can focus on the range (T_TEST, T_MAX). This testing and subdividing can repeat over multiple cycles until the resulting range bounds the estimated prerequisite processing time with a desired precision. As such, the search algorithm can form a binary search tree in which the respective values of T_TEST are nodes. The height of the binary search tree can reflect how many processing cycles occur during the search. The height of the binary search tree can correspond to a precision with which the estimate is obtained (e.g., a length of the final interval).

Exploration of the search space can use a test set of tasks held back from a main population of tasks. For instance, the example task orchestration system can initiate a first proportion of tasks at a first processing time, which can be a prior "best" known processing time. For instance, the first processing time can be associated with a high confidence that prerequisite processes have been performed. The first processing time can be, for instance, selected to have a comfortable margin over the actual prerequisite processing time. The example task orchestration system can initiate a second, smaller proportion of tasks at T_TEST for a given processing cycle. If T_TEST is associated with a satisfactory success rate (e.g., a success rate at least achieving a baseline performance), the processing schedule for the main population of tasks can be updated to use T_TEST instead of the prior time.

In lieu of or in addition to explicitly searching for the value of the prerequisite processing time, example task orchestration systems can learn one or more characterizing parameters of a task schedule using machine learning techniques. For instance, a reinforcement learning algorithm can designate a success rate as a "reward," and one or more characterizing parameters of a task schedule (e.g., a task submission time, such as T_TEST) can be iteratively updated to increase a success rate. An example machine learning approach includes treating a discretized range of T_TEST as a Bernoulli Bandit problem, with a success condition and a failure condition providing binary outcomes from which the system can learn to optimize a likelihood of the success condition. Additionally, or alternatively, a failure rate can be a loss that is used to update one or more characterizing parameters of the task schedule in order to decrease the loss (e.g., using gradient descent or other update techniques).

Example implementations according to example aspects of the present disclosure also provide for optimization of a distribution of requests for each task. For instance, a task can be associated with a corresponding amount of resources needed to perform the task. The task can include a separable task that can be divided into sub-tasks, which can be executed separately at different times. In this manner, for instance, the corresponding amount of resources needed to perform each sub-task can be lower than the total amount for the entire task. A schedule that initiates the multiple sub-tasks over time can diminish a peak demand on resources for performing the task. The distribution can be optimized with respect to various objectives. For instance, a resource profile can be generated to estimate an amount of available resources for performing task(s). Attributes of a task schedule that contains a distribution of multiple sub-tasks over time can be optimized with respect to the resource profile. For instance, a task size, task frequency, task timing, etc. can be optimized with respect to a given resource profile.

Example implementations of the present disclosure can provide a number of technical effects and benefits. For instance, example implementations can generate task schedules that help decrease task failure rates and increase task success rates for tasks orchestrated by one computing system to be executed on another remote computing system. Task failures can result in wasted computing resources. For instance, at least some network transmissions, storage and memory allocation, and processor cycles—and the electricity used to power such hardware—will be expended on the task that fails. As such, task failures contribute to a waste of these allocated resources, as the task does not generate the desired or intended outcome despite consuming at least some input resources. Decreasing task failures can, for example, improve network utilization (e.g., fewer wasted messages), improve processor utilization (e.g., fewer wasted computations), improve memory utilization (e.g., fewer wasted cache allocations), improve power efficiency (e.g., decreasing an amount of energy used to successfully perform a number of tasks).

In addition to improving efficiency of computational resource usage, decreasing a number of task failures can improve a reliability of a computing system. Failed tasks can cause system errors or other exceptions that can halt or otherwise slow a production environment. This downtime can be costly and unpredictable. By increasing a success rate of tasks, example implementations according to aspects of the present disclosure can improve reliability and dependability of computing systems.

Of additional advantage, example implementations according to aspects of the present disclosure can decrease a latency between an earliest feasible task processing time and the actual task processing time. For instance, some tasks can be time-sensitive. It may be desired to complete the tasks as soon as possible (e.g., in the presence of a race condition on resources of the remove computing system). Under traditional schemas, overly conservative delays to await availability of prerequisite(s) for the task can cause excessive latency in the processing of the task. Advantageously, by estimating attributes of the hidden processing schedule for processing the prerequisite(s), example task orchestration system(s) can decrease the latency between the prerequisite availability and the completion of the task.

These and additional advantages of example implementations according to aspects of the present disclosure are evidenced throughout the description and claims. These and additional advantages of example implementations according to aspects of the present disclosure provide improvements to the functioning of computing systems (e.g., individual system(s) that rely on remote computation of tasks, the networked system as a whole, etc.). These and additional advantages of example implementations according to aspects of the present disclosure provide improvements to the fields of networked computing and remote task processing (e.g., cloud computing, distributed computing, etc.) as a whole.

With reference to FIGS. 1A-11, example implementations of the present disclosure are discussed in further detail.

FIG. 1A is a block diagram of a communication timeline of an example environment 100 that can implement various aspects of the present disclosure. A task orchestration system 102 can be responsible for orchestrating a plurality of tasks in a task queue 104. Task orchestration system 102 can schedule initiation of tasks in task queue 104 according to one or more task schedule(s) 106. Task orchestration system 102 can submit tasks in task queue 104 to be processed using a remote computing system 110. Remote computing system 110 can maintain one or more task prerequisites 112. Remote computing system 110 can maintain task prerequisite(s) 112 (e.g., generate, update, or otherwise process the prerequisites, etc.) according to a hidden schedule 114.

Success or failure of a given task can be influenced by task schedule(s) 106. FIG. 1 illustrates three example timings for a task request. For instance, task orchestration system 102 can submit a first task request 120 at a first time according to task schedule(s) 106. Remote computing system 110 can determine a task failure 122 (e.g., adding a count to a failure count 124) and return a failure indicator 126. The task associated with first task request 120 can fail, for example, because one or more prerequisite update(s) 128 to task prerequisites 112 had not yet been performed at the first time.

Alternatively, task orchestration system 102 can submit a second task request 130 at a second time according to task schedule(s) 106. The second time can be offset from prerequisite update(s) 128 by a buffer time 132 (the value of which might not be known to task orchestration system 102). Because prerequisite update(s) 128 occurred prior to the second time, remote computing system can process the task, determine a task success 134, and return a success indicator 136.

Alternatively, task orchestration system 102 can submit a third task request 140 to be processed at a third time according to task schedule(s) 106. The third time can be offset from prerequisite update(s) 128 by a larger delay than buffer time 132. Third task request 140 can be associated with a task failure 142 event. For instance, prerequisite(s) may no longer be satisfied, and remote computing system 110 can return failure indicator 144 in response.

Various features and characteristics of multiple different implementations of the elements in FIG. 1A are described below.

Environment 100 can include a networked or otherwise interconnected computing environment in which systems can communicate for processing various tasks. For example, environment 100 can include multiple computing devices or systems in the same or in different locations. Environment 100 can include multiple systems communicating over the Internet to cooperatively perform tasks. Environment 100 can include multiple devices or systems communicating over a local network or communication channel or bus to perform tasks in a distributed manner (e.g., using one or more workers controlled by a controller). Various devices or systems within environment 100 can be physical computing devices or systems or can be virtual devices or systems instantiated on one or more underlying host machines.

Environment 100 can include one or more information access restrictions. Environment 100 can include one or more security restrictions or barriers. Various devices or systems operating in environment 100 can elect to allow or deny access to information regarding the respective systems.

Environment 100 can be a trustless computing environment. A trustless computing environment can be an environment without or with minimal centralized or "trusted" oversight to establish identity, verify information, etc. For instance, systems in environment 100 can be responsible for collectively or interactively verifying or confirming information in the absence of known reference values.

Task orchestration system 102 can include one or more real or virtualized computing devices configured as described herein. Example computing devices and systems are discussed in more detail with respect to FIG. 11. Task orchestration system 102 can be implemented as a software application or service operating on a host system. For instance, task orchestration system 102 can operate as a controller layer in a distributed computing system. Task orchestration system 102 can operate to instruct third-party computing systems to perform tasks. For instance, task orchestration system 102 can be configured to learn information about other system(s) in environment 100 to efficiently orchestrate the performance of tasks using participating computing systems in environment 100.

Task queue 104 can include a set of tasks awaiting processing. Task queue 104 can generally include a pool of tasks associated with one or more different task types or categories. Example tasks include executing or verifying a data or information exchange (e.g., a transaction, such as a financial transaction, such as a transaction in cryptographic or other currency). Example tasks can form part of a blockchain or other distributed ledger computational architecture. Example tasks include transaction verification tasks in which a performing system verifies the authenticity of transactions using cryptographic algorithms that ensure the integrity and authenticity of the transaction data. Example tasks include consensus achievement. In some examples of trustless computing environments, system(s) can be designed to reach an agreement on the state of the distributed ledger among all participating nodes. This can be achieved through consensus algorithms like Proof-of-Work (PoW) or Proof-of-Stake (PoS).

Example tasks can be arbitrary processing tasks queued for execution by a worker machine (e.g., tasks outside of or unrelated to a blockchain). Example tasks can be data analysis tasks, executing or verifying a data or information exchange (e.g., a transaction, such as a financial transaction), machine-learning inference tasks (e.g., performing inference using one or more machine-learned models), machine-learning training tasks (e.g., performing one or more training iterations or updates to one or more machine-learned models), visualization tasks (e.g., generating graphical renderings of digital information, such as scientific or engineering data, such as real or simulated experimental data), simulation or modeling tasks (e.g., finite element analysis, statistical processing of large datasets, etc.), or in general an arbitrary processing task.

Task orchestration system 102 can receive tasks from other systems and add the tasks to task queue 104. Task orchestration system 102 can generate tasks to add to the task queue 104. For instance, task orchestration system 102 can provide task orchestration as a service to one or more client systems. For instance, a client system can submit one or more tasks to task orchestration system 102, or the client system can request that task orchestration system 102 queue one or more processing tasks configured to implement a desired operation. For example, a client system can send, to task orchestration system 102, a desired operation to be performed. Task orchestration system 102 can determine one or more tasks to be executed to perform the desired operations (e.g., using discrete task(s) of the types described above). The one or more tasks can be of the same or different types. The one or more tasks can all be the same, or at least one of the one or more tasks can have distinct attribute(s).

Task orchestration system 102 can manage the scheduling of task performance on behalf of the client system. Task orchestration system 102 can generate a schedule and initiate processing of the tasks according to the schedule. Task orchestration system 102 can initiate a task according to the schedule by providing instructions to the client system indicating when the client system is to submit a task request for the task. Task orchestration system 102 can initiate a task according to the schedule by submitting the task request on behalf of the client system.

Task schedule(s) 106 can be or include one or more schedules according to which one or more of the tasks in task queue 104 are to be executed. Task schedule(s) 106 can associate processing times with individual or with groups of tasks. A processing time can include an absolute time value. For instance, a processing time can include a date indicator, such as a timestamp. A processing time can include a relative time value. For instance, a processing time can include an offset from a respective reference time associated with a respective task. For instance, a respective task can be associated with a nominal date or time. For instance, a respective task can be a recurring task associated with a respective reference time to perform the task at end of day "on the 1$^{st}$ of the month" or "on the 15$^{th}$ of the month" or on an arbitrarily designated day. A relative time value can provide an offset from the reference time. For instance, an offset of −24 hours can correspond to initiating processing 24 hours before the reference time. In this manner, for instance, an absolute processing time can be determined that implements the offset. For instance, an absolute processing time can be 5:30 pm on May 4 when the relative processing time is −24 hours and the reference time is 5:30 pm on May 5.

Task schedule(s) 106 can include submission times for task requests. The submission times can be associated with or independent of the processing time(s) associated with the requested tasks.

Task schedule(s) 106 can be configured for single task instances or for recurring tasks. Some tasks can recur according to a fixed interval. Some tasks can recur according to other intervals. For recurring tasks, task schedule(s) 106 can define timings for each instance of the task.

Remote computing system 110 can include one or more real or virtualized computing devices configured as described herein. Example computing devices and systems are discussed in more detail with respect to FIG. 11. Remote computing system 110 can be implemented as a software application or service operating on a host system. Remote computing system 110 can be or include a server computing system configured to receive instructions to perform tasks and perform the tasks according to the instructions.

For example, remote computing system 110 can be or include a cloud server computing environment that manages allocation of compute resources for usage on behalf of client systems. For instance, client systems can instruct remote computing system 110 to perform tasks on behalf of the client systems using compute resources of remote computing system 110. For instance, remote computing system 110 can include storage resources, high speed memory resources, processing resources (e.g., CPU, GPU, ML and AI accelerators, etc.), networking resources, etc.

Remote computing system 110 can manage other kinds of resources. Remote computing system 110 can manage data resources on behalf of client systems. Remote computing system 110 can facilitate importing data, exporting data, or storing data on behalf of client systems. Tasks performed by remote computing system 110 can be data storage tasks, data import tasks, data export tasks, data transformation tasks, etc. Remote computing system 110 can manage ledgers which account for financial resources (e.g., in cryptographic currencies, traditional currencies, etc.). Tasks performed by remote computing system 110 can be resource storage tasks, resource import tasks (e.g., credit), resource export tasks (e.g., debit), etc. Performance of the tasks can include updating the ledger(s) based on the completion of the tasks.

Remote computing system 110 can maintain a registry of accounts. Accounts associated with remote computing system 110 can correspond to designated allocations of resource(s). Remote computing system 110 can perform various tasks using resources associated with the respective accounts. For instance, remote computing system 110 can perform tasks by using a quantity of resources that is within an amount allocated to a particular account. The quantity of resources can be subtracted from a ledger or quota for the account (e.g., a quota of GPU hours, an account balance generally, etc.).

Task prerequisites 112 can include events or account statuses that are generally required for successful task processing. For instance, resource availability can be a prerequisite to executing tasks that use the resources. For instance, a task that requires a specified amount of a resource (e.g., number of GPU hours) can fail if the specified amount of resource is not currently available in association with an account associated with the task.

Remote computing system 110 can perform updates to task prerequisites 112. For example, remote computing system 110 can update an amount of resources available in association with various accounts. The availability of such resources can be a prerequisite for performing tasks submitted by other system(s) (e.g., tasks submitted by task orchestration system 102). For example, remote computing system 110 can have a load balancing system that regulates usage rates of resources (e.g., storage capacity, processing time, GPU hours, network bandwidth, etc.) by periodically refreshing or resetting a usage quota for accounts (e.g., monthly resetting an available amount of resources). In this manner, for instance, accounts can have a capped utilization on a monthly basis to avoid resource hogging. In another example remote computing system 110 can update amounts of resources associated with accounts based on amounts of resources provided by external systems to be added to the account. For instance, a client system can instruct remote computing system 110 to add an amount of resources to a resource ledger associated with an account (e.g., receiving payment to the account). A client system can instruct remote computing system 110 to remove an amount of resources from a resource ledger associated with an account (e.g., extracting payment from the account). In this manner, for instance, the availability of resources in association with the account can vary over time.

Hidden schedule 114 can include a timing for when the remote computing system 110 performs updates to task prerequisites 112. For instance, an instruction for remote computing system 110 to update an amount of resources associated with an account may provide a general timeframe within which the account is to be updated. For instance, the instruction may generally indicate that the resources are to be updated each month on or by a particular day of the month. The actual execution time of the update can be scheduled according to hidden schedule 114. For instance, the actual execution time can be on the particular day, on a prior day, two days prior, etc.

Because hidden schedule 114 might not be available or accessible to task orchestration system 102, task orchestration system 102 can submit tasks to be processed before prerequisites have been updated/refreshed. Because resource levels might be low at such a time, there can be an increased likelihood that the task could fail.

First task request 120 can be or include an instruction to perform a task. Task orchestration system 102 can initiate first task request 120. Task orchestration system 102 can initiate first task request 120 by sending first task request 120 to remote computing system 110. Task orchestration system 102 can initiate first task request 120 by providing information to a client system (e.g., a time or scheduling for sending request(s)) to facilitate the client system to send first task request 120 to remote computing system 110.

First task request 120 can correspond to a variety of tasks. First task request 120 can correspond to a task that consumes or otherwise uses an amount of resources. First task request 120 can correspond to a task that uses an amount of resources associated with a particular account.

First task request 120 can be submitted at a particular time at which the requested task is desired to be executed. First task request 120 can be submitted at any time and include an identified time at which the requested task is desired to be executed. The submission time of first task request 120 can be different from the identified time at which the requested task is desired to be executed.

Task failure 122 can be or include an event determined by remote computing system 110 responsive to detecting that a task requested by first task request 120 will fail or has failed (e.g., at least at the requested processing time). Remote computing system 110 can determine task failure 122 by, for example, determining that a prerequisite for the task requested by first task request 120 is not satisfied as of the requested processing time. For instance, the task requested by first task request 120 can have a prerequisite of a certain amount of resources (e.g., compute resources, network resources, financial resources, etc.) to allow completion. The task requested by first task request 120 can identify an account from which the resources should be allocated. Remote computing system 110 can determine that the account, as of the requested processing time of first request 120, is not associated with the prerequisite resources. This can be, for example, because the prerequisite resources had not yet been updated, released, or otherwise processed as of the requested processing time of first request 120.

Failure count 124 can be or include a counter of failed tasks associated with an account. For instance, remote computing system 110 can maintain a record of failed tasks for each account. In some systems, task failures can incur a penalty or cost associated with the account.

Failure indicator 126 can be or include an indication message that signals that the task requested by first task request 120 failed, is expected to fail, or could not be initiated as requested.

Prerequisite update(s) 128 can include an update to a prerequisite used by a task. Prerequisite update(s) 128 can include an update to an amount of resources associated with an account. Prerequisite update(s) 128 can include a periodic or recurring update. Prerequisite update(s) 128 can include, for instance, an addition or transfer of resources into an account.

Prerequisite update(s) 128 can be performed according to hidden schedule 114. For instance, the timing (e.g., time of day) of prerequisite update(s) 128 can be specified by hidden schedule 114.

Second task request 130 can be the same as or different from first task request 120. Second task request 130 can request the same task or a different task as compared to first task request 120. Second task request 130 can be initiated at a later time as compared to first task request 120. Second task request 130 can be initiated after prerequisite update(s) 128 are performed.

Second task request 130 can be configured to initiate processing of a task that uses an amount of resources less than the expected amount of resources released after prerequisite update(s) 128. For instance, task orchestration system 102 can determine an approximate amount of resources released in one or more prerequisite update(s) 128. Task orchestration system 102 can configure a task to use less than the approximated amount. In this manner, for instance, task orchestration system 102 can determine that, if prerequisite update(s) 128 have been performed, the requested task can succeed.

Second task request 130 can be submitted at a particular time at which the requested task is desired to be executed. Second task request 130 can be submitted at any time and include an identified time at which the requested task is desired to be executed. The submission time of second task request 130 can be different from the identified time at which the requested task is desired to be executed.

To increase a likelihood of the requested task succeeding, second task request 130 can be submitted with a delay to ensure that prerequisite update(s) 128 have been performed.

Task orchestration system 102 can determine a reference time at which prerequisite update(s) 128 are expected to be performed. For instance, for a known recurring update to an amount of resources associated with an account (e.g., on a given day of the month, day of the week, etc.), task orchestration system can submit second task request 130 with a zero or positive offset to the reference time (e.g., submitting the request with no delay or with a positive delay) to allow time for the prerequisite update(s) 128 to be completed before submitting the request.

Buffer time 132 can be a margin between the actual time prerequisite update(s) 128 are performed and the time second task request 130 is submitted. The exact value of buffer time 132 might be unknown if the exact time at which prerequisite update(s) 128 are processed is unknown. However, second task request 130 can be submitted with sufficient delay to ensure that the corresponding task is processed after prerequisite update(s) 128 are performed.

Task success 134 can be or include an event determined by remote computing system 110 responsive to detecting that a task requested by first task request 120 will succeed or has succeeded. Remote computing system 110 can determine task success 134 by, for example, determining that a prerequisite for the task requested by second task request 130 is satisfied. For instance, the task requested by second task request 130 can have a prerequisite of a certain amount of resources (e.g., compute resources, network resources, financial resources, etc.) to allow completion. The task requested by second task request 130 can identify an account from which the resources should be allocated. Remote computing system 110 can determine that the account, as of the time of second request 130, is associated with the prerequisite resources. This can be, for example, because the prerequisite resources had already been updated, released, or otherwise processed as of the time of second request 130. This can also be, for example, because there were sufficient resources in association with the account even before prerequisite update(s) 128 were performed.

Success indicator 136 can be or include an indication message that signals that the task requested by second task request 130 succeeded, is expected to succeed, etc.

Third task request 140 can be a request to perform a task at some time after second task request 130. Third task request 140 can be the same as or different from second task request 130. Third task request 140 can be associated with the same account or a different account as second task request 130.

Task failure 142 can be the same as or different from task failure 122. Task failure 142 can indicate that a prerequisite for the task requested by third task request 140 was not satisfied. Task failure 142 can occur even after prerequisite update(s) 128. For instance, prerequisite update(s) 128 can include an update to an amount of available resources for performing tasks. The amount of available resources can decrease over time. The amount of available resources can decrease over time due to utilization of the resources by other task(s) (e.g., submitted by other systems). Accordingly, by the time of a processing time for the task requested in third task request 140, the prerequisite(s) may no longer be satisfied.

Failure indicator 144 can be the same as or different from failure indicator 126. Generally, failure indicator 144 can indicate that the task requested by third task request 140 failed, will fail, did not complete, was unable to initiate, etc.

As illustrated in the example implementation depicted in FIG. 1, the processing times for various tasks with respect to prerequisite update(s) 128 can affect a likelihood of success.

For example, for prerequisites that relate to availability of resources, the amount of available resources can vary over time. The probability of task success can vary based on an amount of resources required by the task and the amount of available resources at the processing time of the task.

Figure 2:
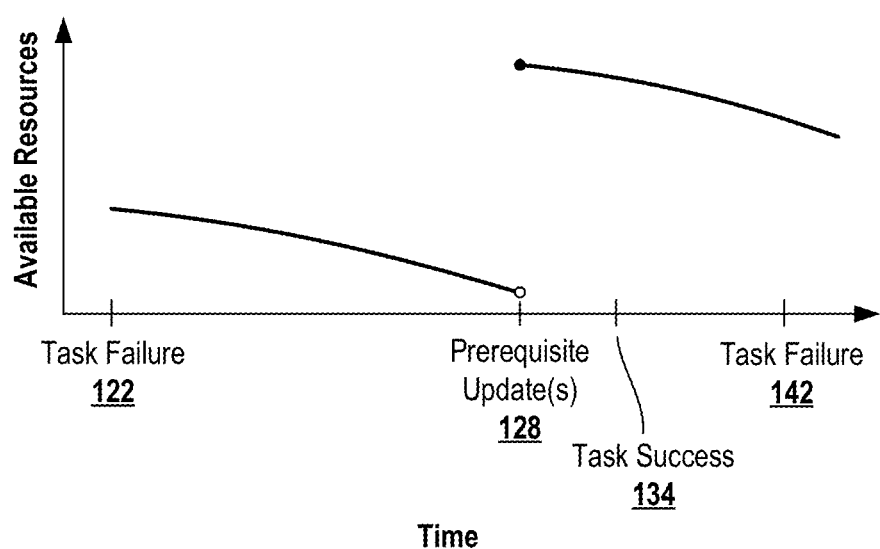
FIG. 2 is a chart illustrating an example resource profile according to some implementations of the present disclosure.

FIG. 2 is a chart illustrating an example resource profile associated with the remote computing system 110. For example, at a time of processing the task associated with first task request 120 (e.g., the time at which task failure 122 can occur), an amount of available resources can be at a first level. This level can be insufficient for performing the requested task. At a time of processing the task associated with second task request 130 (e.g., the time at which task success 134 can occur), an amount of available resources can be at a second level higher than the first level and can be sufficient for performing the requested task(s). At a time of processing the task associated with third task request 140 (e.g., a time at which task failure 142 can occur), an amount of available resources can be at a third level lower than the second level. The third level can be higher or lower than the first level. The third level can be insufficient for performing the requested task.

In this manner, for instance, resources associated with the allotment for the account can be consumed or used over time. The prerequisite update(s) can provide a step change in resource availability, but the resources can continue to be used. As such, the amount of available resources can continue to decline after the step change.

Accordingly, task orchestration system 102 can be configured to optimize task schedule(s) 106 to optimize a likelihood that any prerequisite(s) are available at the time of a requested processing time for a requested task. For instance, task orchestration system 102 can be configured to cause tasks to be processed after prerequisite update(s) 128 without undue delay. To optimize the timing of task request(s), task orchestration system 102 can directly or indirectly optimize a value of buffer time 132. For instance, task orchestration system 102 can explore configurations of task schedule(s) 106 that decrease buffer time 132.

Figure 3:
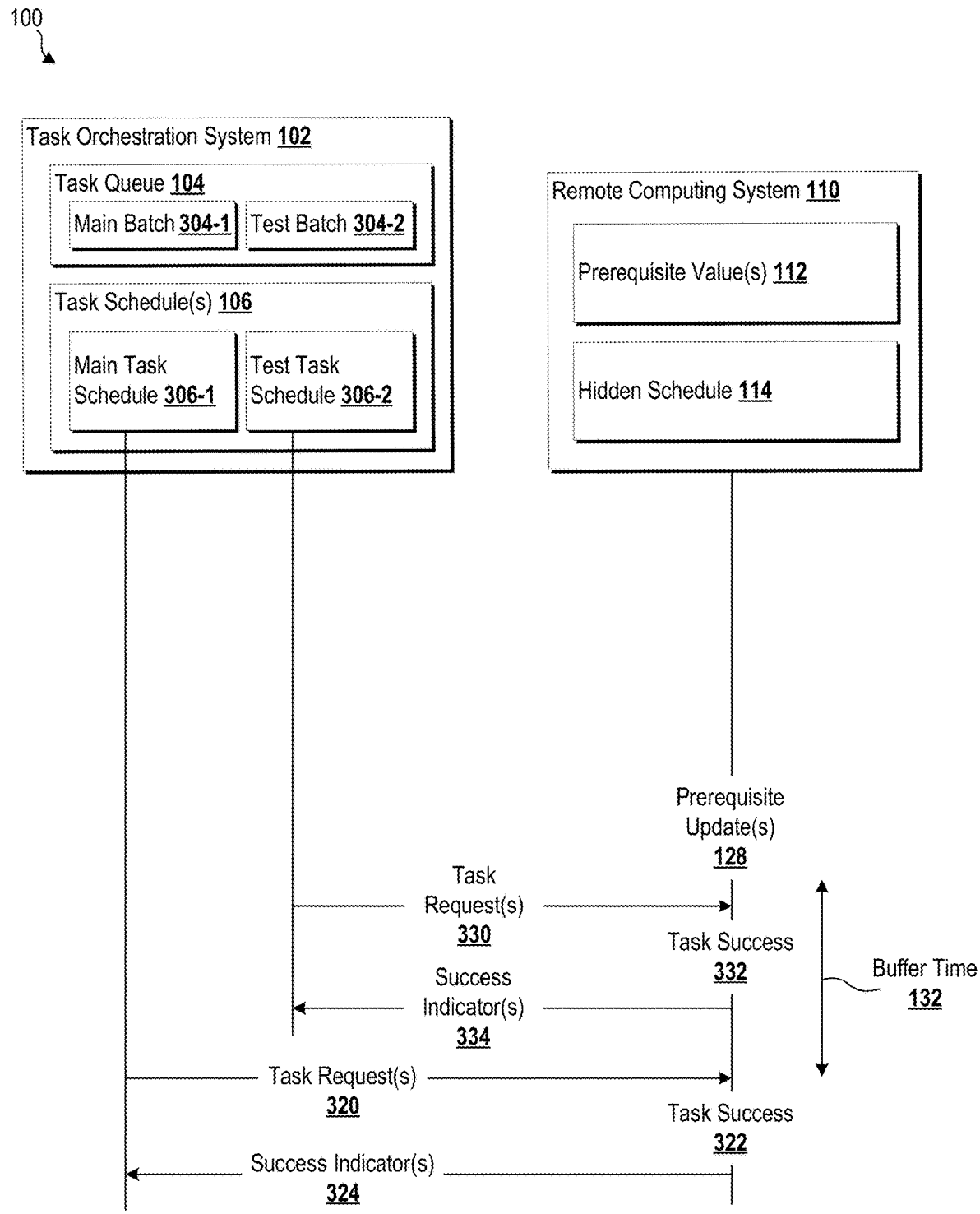
FIG. 3 is a block diagram of an example implementation of a task orchestration system according to some implementations of the present disclosure.

FIG. 3 is a block diagram of an example implementation of task orchestration system 102 configured to optimize the timing of tasks. Task queue 104 can include a main batch 304-1 and a test batch 304-2. Task schedule(s) 106 can include a main task schedule 306-1 and a test task schedule 306-2. For example, main task schedule 306-1 can be configured to use known "safe" timings to initiate processing of tasks in main batch 304-1 with satisfactory confidence of task success. Test task schedule 306-2 can be configured to use more aggressive timings for processing tasks in test batch 304-2 to probe the attributes of hidden processing schedule 114.

For example, task orchestration system can submit task request(s) 320 from main batch 304-1 according to main task schedule 306-1. Because main task schedule 306-1 can use a known "safe" timing that is some buffer time 132 after prerequisite update(s) 128, remote computing system 110 can determine task success 322 for task request(s) 320 and return success indicator(s) 324.

To explore possible earlier processing times, task orchestration system 102 can use earlier timings in test task schedule 306-2 for initiating processing of tasks in test batch 304-2. For instance, task orchestration system 102 can initiate task request(s) 330 to be processed at an earlier time (e.g., as compared to task request(s) 320). Because task request(s) 330 are processed by remote computing system 110 after prerequisite update(s) 128, remote computing system 110 can determine task success 332 for task request(s) 330 and return success indicator(s) 334.

In this manner, for instance, task orchestration system 102 can determine that buffer time 132 can be reduced. For instance, task orchestration system 102 can determine that main task schedule 304-1 can be adjusted to align with test task schedule 306-2.

Various features and characteristics of multiple different implementations of the elements in FIG. 3 are described below.

Main batch 304-1 can include a proportion of tasks designated for processing on a standard or default processing schedule. Main batch 304-1 can include the majority of tasks in task queue 104.

Test batch 304-2 can include a proportion of tasks designated for processing on a test or exploratory processing schedule. Test batch 304-2 can include fewer tasks than main batch 304-2.

Main task schedule 306-1 can include a task schedule indicating processing time(s) (e.g., absolute processing times, relative processing times, etc.) for tasks in main batch 304-1. For instance, tasks in main batch 304-1 can be submitted for processing at a processing time (e.g., absolute processing time, relative processing time, etc.) that has been associated with satisfactory success rate(s) in the past.

For example, main task schedule 306-1 can initiate tasks in main batch 304-1 with relatively low or zero offsets from reference time associated with the tasks. For instance, each task can be associated with a reference processed time (that can be the same as or different from reference time(s) of other tasks). Respective tasks in main batch 304-1 can be scheduled for execution at a respective offset from the respective reference processing time. The respective offset for each task can be common to tasks in main batch 304-1. The respective offset can be customized or adapted to the respective task.

Main task schedule 306-1 can schedule tasks for processing at different absolute processing times while sharing the same or similar relative processing times. For instance, main task schedule 306-1 can schedule tasks for processing on different days. However, reference times for the tasks can also be on different days, such that main task schedule 306-1 can schedule tasks based on a common or shared offset processing time (e.g., all tasks to process n hours before the corresponding reference time, etc.).

Test task schedule 306-2 can include a task schedule indicating processing time(s) (e.g., absolute processing times, relative processing times, etc.) for tasks in test batch 304-2. For instance, tasks in test batch 304-2 can be submitted for processing at a processing time (e.g., absolute processing time, relative processing time, etc.) that is selected to probe hidden schedule 114 (e.g., to estimate when prerequisite update(s) 128 are performed).

For example, test task schedule 306-2 can initiate tasks in test batch 304-2 with relatively higher offsets from reference time associated with the tasks (e.g., as compared to main task schedule 306-1). For instance, each task can be associated with a reference processed time (that can be the same as or different from reference time(s) of other tasks). Respective tasks in test batch 304-2 can be scheduled for execution at a respective offset from the respective reference processing time. The respective offset for each task can be common to tasks in test batch 304-2. The respective offset can be customized or adapted to the respective task.

Test task schedule 306-2 can schedule tasks for processing at different absolute processing times while sharing the same or similar relative processing times. For instance, test task schedule 306-2 can schedule tasks for processing on different days. However, reference times for the tasks can also be on different days, such that test task schedule 306-2 can schedule tasks based on a common or shared offset processing time (e.g., all tasks to process n hours before the corresponding reference time, etc.).

In this manner, for instance, a smaller test batch 304-2 can be used to explore different offset values to determine if different offset values can improve a success rate for tasks in test batch 304-2.

Task request(s) 320 can be or include an instruction to perform a task. Task orchestration system 102 can initiate task request(s) 320. Task orchestration system 102 can initiate task request(s) 320 by sending task request(s) 320 to remote computing system 110. Task orchestration system 102 can initiate task request(s) 320 by providing information to a client system (e.g., a time or scheduling for sending request(s)) to facilitate the client system to send task request(s) 320 to remote computing system 110.

Task request(s) 320 can correspond to a variety of tasks. Task request(s) 320 can correspond to a task that consumes or otherwise uses an amount of resources. Task request(s) 320 can correspond to a task that uses an amount of resources associated with a particular account.

Task request(s) 320 can be submitted at a particular time at which the requested task is desired to be executed. Task request(s) 320 can be submitted at any time and include an identified time at which the requested task is desired to be executed. The submission time of task request(s) 320 can be different from the identified time at which the requested task is desired to be executed.

Task success 322 can be the same as or different from task success event 134. Task success events can be determined for one or more of the requested tasks.

Success indicator(s) 324 can indicate a successful execution of one or more of the requested tasks. It is to be understood that some tasks can fail while others can succeed. Success indicator(s) 324 can be accompanied by one or more failure indicators.

Task request(s) 330 can be or include an instruction to perform a task. Task orchestration system 102 can initiate task request(s) 330. Task orchestration system 102 can initiate task request(s) 330 by sending task request(s) 330 to remote computing system 110. Task orchestration system 102 can initiate task request(s) 330 by providing information to a client system (e.g., a time or scheduling for sending request(s)) to facilitate the client system to send task request(s) 330 to remote computing system 110.

Task request(s) 330 can correspond to a variety of tasks. Task request(s) 330 can correspond to a task that consumes or otherwise uses an amount of resources. Task request(s) 330 can correspond to a task that uses an amount of resources associated with a particular account.

Task request(s) 330 can be submitted at a particular time at which the requested task is desired to be executed. Task request(s) 330 can be submitted at any time and include an identified time at which the requested task is desired to be executed. The submission time of task request(s) 330 can be different from the identified time at which the requested task is desired to be executed.

Task request(s) 330 can be initiated according to test task schedule 306-2. For instance, task request(s) 330 can be initiated with different offset(s) from corresponding reference times for the requested tasks. For instance, task request(s) 330 can be initiated at an earlier time as compared to task request(s) 320. Task request(s) 330 can be initiated using a relative time that schedules execution of the tasks further in advance of the reference time. For instance, for relative processing times that indicate a processing time n hours in advance of the reference time, task request(s) 330 can be submitted with a higher value of n as compared to task request(s) 320.

Task request(s) 330 can include multiple requests. Each of the multiple requests can correspond to different accounts associated with remote computing system 110. Each request can rely on a prerequisite condition associated with a particular account (e.g., an amount of resources allotted to that account).

Task success 332 can be the same as or different from task success event 134 or 322. Task success events can be determined for one or more of the requested tasks.

Success indicator(s) 334 can indicate a successful execution of one or more of the requested tasks. It is to be understood that some tasks can fail while others can succeed. Success indicator(s) 334 can be accompanied by one or more failure indicators.

In general, because test task schedule 306-2 initiated processing of the tasks at a time after prerequisite update(s) 128, the tasks requested in task request(s) 330 can benefit from the prerequisite update(s) 128 and, for instance, use resources that were added or released in prerequisite update(s) 128.

Task orchestration system 102 can analyze responses received from remote computing system 110 and can determine that test task schedule 306-2 satisfies a success condition. A success condition can indicate a satisfactory success rate (e.g., equaling or exceeding a baseline success rate of main task schedule 306-1) for tasks submitted according to the schedule. A success condition can be based on a statistical analysis of success indicator(s) 334. For instance, success indicator(s) 334 can be received along with one or more failure indicator(s) associated with task request(s) 330. A success condition can be determined based on a success rate (e.g., a proportion of successful tasks out of the total amount of tasks requested, etc.) meeting or exceeding a threshold rate. A threshold rate can be determined based on a baseline success rate of main task schedule 306-1.

A size of test batch 304-2 can be selected to provide a desired confidence level in the computation of the statistical analyses providing the success condition. For instance, a size of test batch 304-2 can correspond to a sample size sufficient to provide desired confidence bounds on the success rate. For example, test batch 304-2 can be larger than about 30 tasks.

Task orchestration system 102 can update main task schedule 306-1 to adopt the timing of test task schedule 306-2. Task orchestration system 102 can generate a new test task schedule for further testing.

Figure 4:
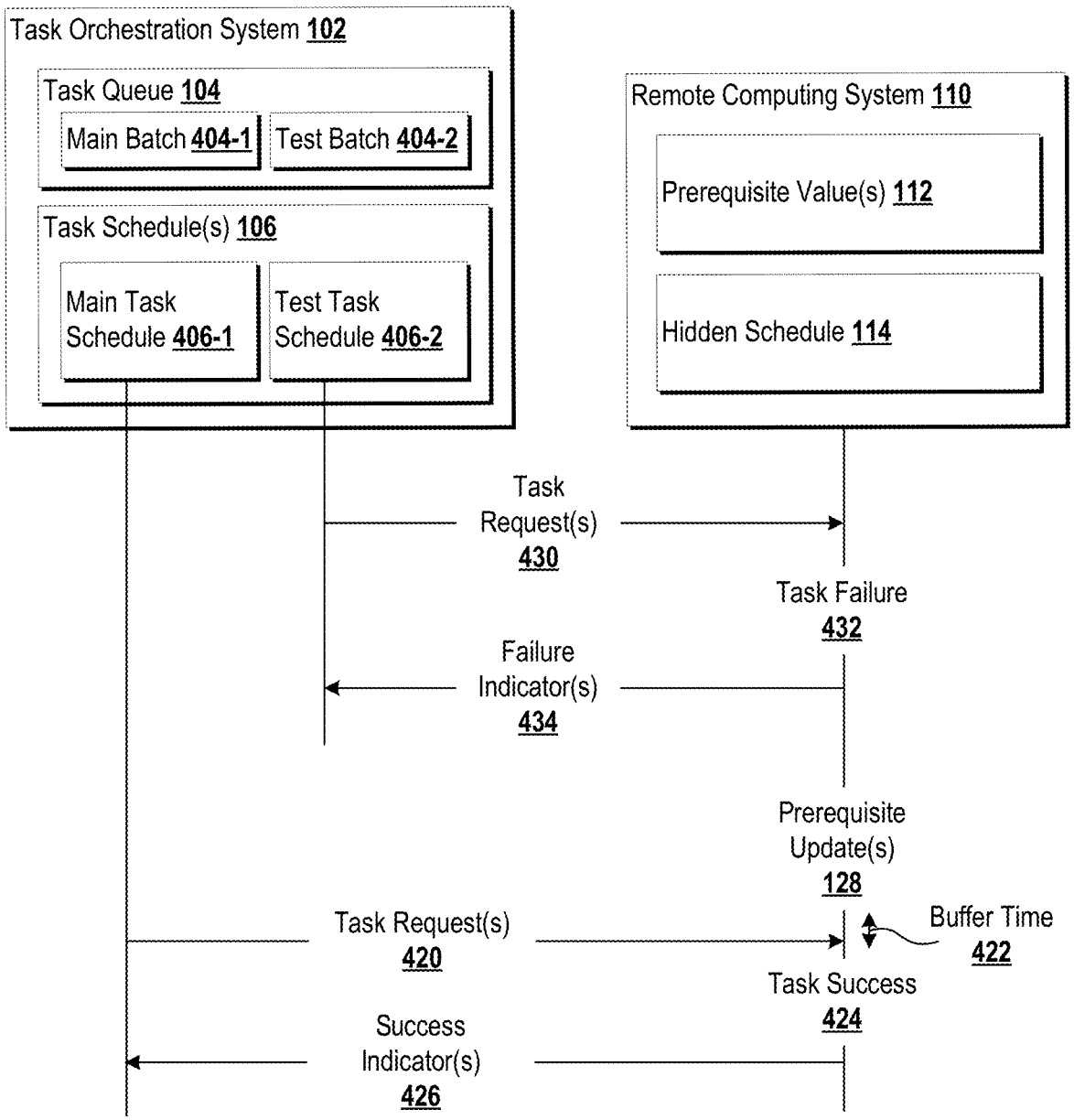
FIG. 4 is a block diagram of an example implementation of a task orchestration system according to some implementations of the present disclosure.

FIG. 4 is a block diagram of an example implementation of task orchestration system 102 testing a new test task schedule. For example, task queue 104 can include a main batch 404-1 (which can be the same as or different from main batch 304-1) and a test batch 404-2 (which can be the same as or different from test batch 304-2). Task schedule(s) 106 can include a new main task schedule 406-1 (e.g., based on prior task schedule 306-2) and a new test task schedule 406-2.

Task orchestration system 102 can submit task request(s) 420 according to new main task schedule 406-1. Because new main task schedule 406-1 uses the timing from prior tasks request(s) 330, for which a success condition can be determined, it can be expected that task request(s) 420 will generally succeed. Task request(s) 420 can be characterized by a buffer time 422 smaller than buffer time 132. Remote computing system 110 can determine task success 424 for task request(s) 420 and return success indicator(s) 426.

Task request(s) 430 can be initiated based on test task schedule 406-2. Test task schedule 406-2 can be configured to initiate tasks at earlier time(s) to further probe hidden schedule 114 to estimate a time at which prerequisite update(s) 128 occur. As illustrated in FIG. 4, task request(s) 430 can be associated with a processing time before prerequisite update(s) 128 occur, and remote computing system 110 can determine task failure 432 events and return failure indicator(s) 434.

Various features and characteristics of multiple different implementations of the elements in FIG. 4 are described below.

Main batch 404-1 can include a proportion of tasks designated for processing on a standard or default processing schedule. Main batch 404-1 can include the majority of tasks in task queue 104. Main batch 404-1 can include tasks associated with the same or different accounts as associated with main batch 304-1.

Test batch 404-2 can include a proportion of tasks designated for processing on a test or exploratory processing schedule. Test batch 404-2 can include fewer tasks than main batch 404-2. Test batch 404-2 can include tasks associated with the same or different accounts as associated with test batch 304-2. For example, tasks in the test batches can be selected to rotate account(s) associated with the test batches. For example, tasks in the test batches can have a higher likelihood of failure.

Task orchestration system 102 can select tasks for the test batches to evenly distribute participation rates in the test batches across the population of accounts. For example, task orchestration system 102 can maintain a record of which accounts have had tasks processed in a test batch. Task orchestration system 102 can maintain a record of which accounts have had tasks fail when processed in a test batch. Task orchestration system 102 can construct test batches to avoid repeatedly exposing accounts to a higher likelihood of failure, such as accounts that have already experienced a task failure in a test batch.

For example, task orchestration system 102 can randomly sample tasks from task queue 104 to participate in a test batch. The tasks can be sampled with a prior probability that can be adjusted based on the account's participation in prior test batches. For example, a task associated with an account that was present in a prior test batch can be sampled with a lower probability than a task associated with an account that was not present in a prior test batch.

Main task schedule 406-1 can include a task schedule indicating processing time(s) (e.g., absolute processing times, relative processing times, etc.) for tasks in main batch 404-1. For instance, tasks in main batch 404-1 can be submitted for processing at a processing time (e.g., absolute processing time, relative processing time, etc.) that has been associated with satisfactory success rate(s) in the past.

For example, main task schedule 406-1 can initiate tasks in main batch 404-1 with an improved offset from reference time associated with the tasks. For example, similar to main task schedule 306-1, each task in main batch 404-1 can be associated with a reference processing time (that can be the same as or different from reference time(s) of other tasks). Respective tasks in main batch 404-1 can be scheduled for execution at a respective offset from the respective reference processing time. The respective offset for each task can be common to tasks in main batch 404-1. The respective offset can be customized or adapted to the respective task.

The processing time(s) used in main task schedule 406-1 can be based on results from prior experiments using test task schedule(s) 306-2. For instance, offsets or other processing time(s) used in test task schedule(s) 306-2 can, based on a determination of a success condition associated with the processing time(s), be incorporated into main task schedule 406-1.

Main task schedule 406-1 can schedule tasks for processing at different absolute processing times while sharing the same or similar relative processing times. For instance, main task schedule 406-1 can schedule tasks for processing on different days. However, reference times for the tasks can also be on different days, such that main task schedule 406-1 can schedule tasks based on a common or shared offset processing time (e.g., all tasks to process n hours before the corresponding reference time, etc.).

Test task schedule 406-2 can include a task schedule indicating processing time(s) (e.g., absolute processing times, relative processing times, etc.) for tasks in test batch 404-2. For instance, tasks in test batch 404-2 can be submitted for processing at a processing time (e.g., absolute processing time, relative processing time, etc.) that is selected to probe hidden schedule 114 (e.g., to estimate when prerequisite update(s) 128 are performed).

For example, test task schedule 406-2 can initiate tasks in test batch 406-2 with relatively higher offsets from reference time associated with the tasks (e.g., as compared to main task schedule 406-1). For instance, each task can be associated with a reference processed time (that can be the same as or different from reference time(s) of other tasks). Respective tasks in test batch 404-2 can be scheduled for execution at a respective offset from the respective reference processing time. The respective offset for each task can be common to tasks in test batch 404-2. The respective offset can be customized or adapted to the respective task.

Test task schedule 406-2 can schedule tasks for processing at different absolute processing times while sharing the same or similar relative processing times. For instance, test task schedule 406-2 can schedule tasks for processing on different days. However, reference times for the tasks can also be on different days, such that test task schedule 406-2 can schedule tasks based on a common or shared offset processing time (e.g., all tasks to process n hours before the corresponding reference time, etc.).

In this manner, for instance, a smaller test batch 404-2 can be used to explore different offset values to determine if different offset values can improve a success rate for tasks in test batch 406-2.

Task request(s) 420 can be or include an instruction to perform a task. Task orchestration system 102 can initiate task request(s) 420. Task orchestration system 102 can initiate task request(s) 420 by sending task request(s) 420 to remote computing system 110. Task orchestration system 102 can initiate task request(s) 420 by providing information to a client system (e.g., a time or scheduling for sending request(s)) to facilitate the client system to send task request(s) 420 to remote computing system 110.

Task request(s) 420 can correspond to a variety of tasks. Task request(s) 420 can correspond to a task that consumes or otherwise uses an amount of resources. Task request(s) 420 can correspond to a task that uses an amount of resources associated with a particular account.

Task request(s) 420 can be submitted at a particular time at which the requested task is desired to be executed. Task request(s) 420 can be submitted at any time and include an identified time at which the requested task is desired to be executed. The submission time of task request(s) 420 can be different from the identified time at which the requested task is desired to be executed.

Task success 424 can be the same as or different from task success event 134. Task success events can be determined for one or more of the requested tasks.

Success indicator(s) 424 can indicate a successful execution of one or more of the requested tasks. It is to be understood that some tasks can fail while others can succeed. Success indicator(s) 424 can be accompanied by one or more failure indicators.

Task request(s) 430 can be or include an instruction to perform a task. Task orchestration system 102 can initiate task request(s) 430. Task orchestration system 102 can initiate task request(s) 430 by sending task request(s) 430 to remote computing system 110. Task orchestration system 102 can initiate task request(s) 430 by providing information to a client system (e.g., a time or scheduling for sending request(s)) to facilitate the client system to send task request(s) 430 to remote computing system 110.

Task request(s) 430 can correspond to a variety of tasks. Task request(s) 430 can correspond to a task that consumes or otherwise uses an amount of resources. Task request(s) 430 can correspond to a task that uses an amount of resources associated with a particular account.

Task request(s) 430 can be submitted at a particular time at which the requested task is desired to be executed. Task request(s) 430 can be submitted at any time and include an identified time at which the requested task is desired to be executed. The submission time of task request(s) 430 can be different from the identified time at which the requested task is desired to be executed.

Task request(s) 430 can be initiated according to test task schedule 406-2. For instance, task request(s) 430 can be initiated with different offset(s) from corresponding reference times for the requested tasks. For instance, task request(s) 430 can be initiated at an earlier time as compared to task request(s) 420. Task request(s) 430 can be initiated using a relative time that schedules execution of the tasks further in advance of the reference time. For instance, for relative processing times that indicate a processing time n hours in advance of the reference time, task request(s) 430 can be submitted with a higher value of n as compared to task request(s) 420.

Task request(s) 430 can include multiple requests. Each of the multiple requests can correspond to different accounts associated with remote computing system 110. Each request can rely on a prerequisite condition associated with a particular corresponding account (e.g., an amount of resources allotted to that account).

Task failure 432 can be the same as or different from task failure event 122 or 142. Task failure events can be determined for one or more of the requested tasks.

Failure indicator(s) 434 can indicate an incomplete execution of one or more of the requested tasks. It is to be understood that some tasks can fail while others can succeed. Failure indicator(s) 434 can be accompanied by one or more success indicators.

In general, because test task schedule 406-2 initiated processing of the tasks at a time before prerequisite update(s) 128, the tasks requested in task request(s) 430 might not benefit from the prerequisite update(s) 128 and, for instance, might be unable to use resources that would later be added or released in prerequisite update(s) 128. In a scenario in which the prerequisite is an amount of resources, an account corresponding to a task can have residual resources that would enable a requested task to be completed even before prerequisite update(s) 128. In some cases, however, sufficient residual resources can be present with low probability, and the majority of tasks requested in task request(s) 430 can fail.

Task orchestration system 102 can analyze responses received from remote computing system 110 and can determine that test task schedule 406-2 satisfies a failure condition. A failure condition can indicate that the measured success rate is not satisfactory (e.g., not exceeding a baseline success rate of main task schedule 406-1) for tasks submitted according to the schedule. A failure condition can be based on a statistical analysis of failure indicator(s) 434. For instance, failure indicator(s) 434 can be received along with one or more success indicator(s) associated with task request(s) 430. A failure condition can be determined based on a success rate (e.g., a proportion of successful tasks out of the total amount of tasks requested, etc.) not exceeding a threshold rate. A threshold rate can be determined based on a baseline success rate of main task schedule 406-1.

A size of test batch 404-2 can be selected to provide a desired confidence level in the computation of the statistical analyses providing the success condition. For instance, a size of test batch 404-2 can correspond to a sample size sufficient to provide desired confidence bounds on the success rate. For example, test batch 404-2 can be larger than about 30 tasks.

Task orchestration system 102 can determine to not update main task schedule 406-1 to adopt the timing of test task schedule 406-2. Task orchestration system 102 can generate a new test task schedule for further testing.

In this manner, for instance, task orchestration system 102 can search for an optimal task schedule. Task orchestration system 102 can apply one or more efficient search algorithms to identify improved parameters for a task schedule. For example, task orchestration system 102 can conduct a search to estimate a value of a prerequisite processing time at which prerequisite update(s) 128 are performed. This estimated value can then be used to construct a task schedule that optimizes a task processing time as described herein.

Figure 5:
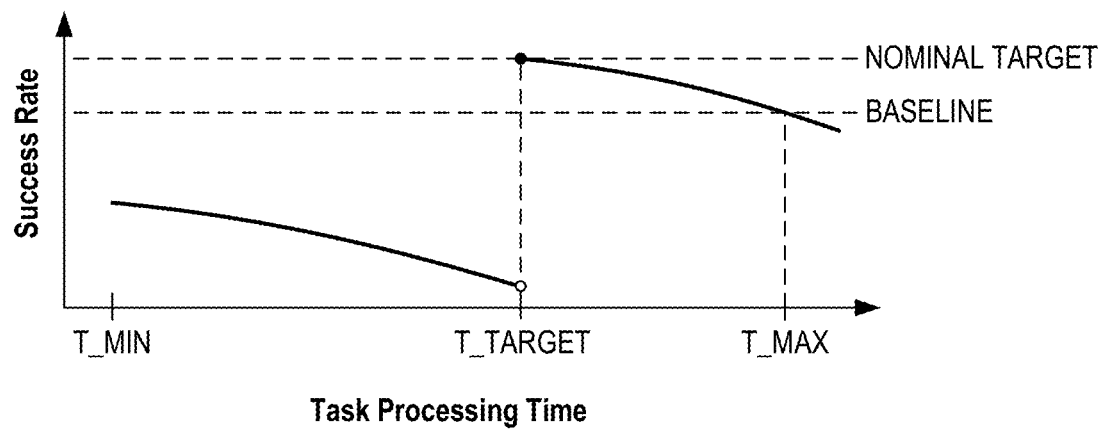
FIG. 5 is an example success rate curve that maps a variation of success rate over time according to some implementations of the present disclosure.

FIG. 5 is an example success rate curve that maps a variation of success rate over time. Task orchestration system 102 can conduct a search across a range of T_MIN to T_MAX to identify a task processing time that optimizes the success rate. In some scenarios, the actual prerequisite processing time T_TARGET might be unknown. Accordingly, task orchestration system 102 can explore the range of T_MIN to T_MAX based on an objective of improving a success rate over a baseline rate. For example, a baseline rate can be set by a baseline success rate using a known "safe" task processing time.

Figure 6A:
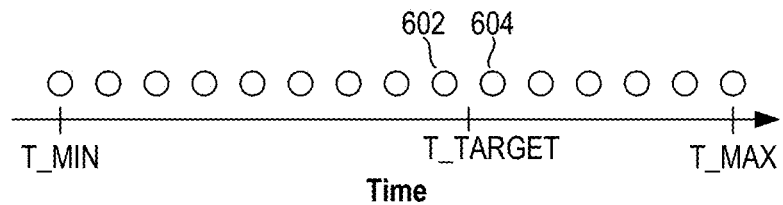
FIG. 6A is a timeline chart of an example sequence of task schedule configurations according to some implementations of the present disclosure.
Figure 6B:
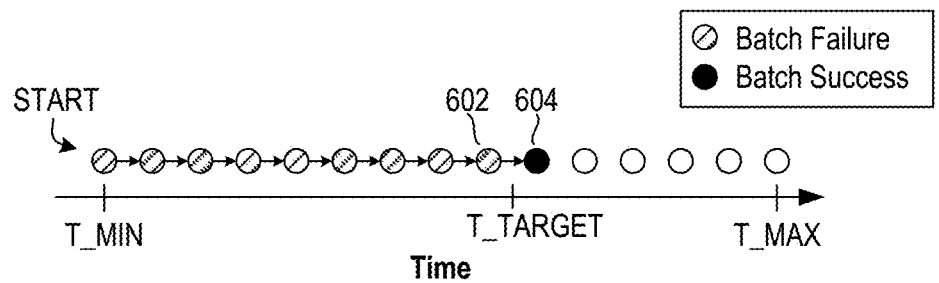
FIG. 6B is a timeline chart illustrating an example linear search algorithm for the task schedules introduced in FIG. 6A according to some implementations of the present disclosure.
Figure 6C:
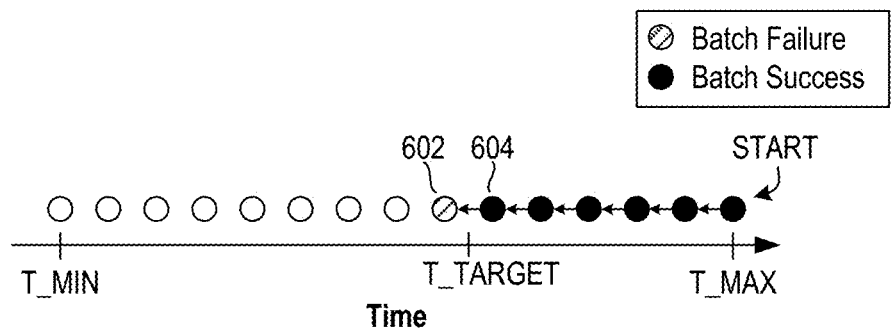
FIG. 6C is a timeline chart illustrating another example linear search algorithm for the task schedules introduced in FIG. 6A according to some implementations of the present disclosure.

FIGS. 6A to 6C illustrate an example linear search algorithm that task orchestration system 102 can implement to estimate for T_TARGET. FIG. 6A is a timeline chart of an example sequence of task schedule configurations. A scope of exploration can range from T_MIN to T_MAX. T_MIN and T_MAX can be selected based on a coarse estimate that T_TARGET can be within the range defined thereby. For instance, for prerequisites that are generally scheduled to be completed by a particular calendar day, T_MIN can be 48 hours before the end of the particular calendar day, and T_MAX can be the end of the particular calendar day. Other values for T_MIN and T_MAX can be used.

In FIGS. 6A to 6C, nodes represent task processing times in respective test task schedules. For example, FIGS. 6A to 6C illustrate 15 different task processing times to be tested (e.g., 15 different test task schedule(s) 306-2, 406-2, etc.).

The distance between nodes can represent a precision of the estimate for T_TARGET. For example, T_TARGET can lie between nodes 602 and 604. Task orchestration system can evaluate each of nodes 602 and 604 to determine if one is associated with a success condition and one is associated with a failure condition. For example, if node 602 is associated with a failure condition and node 604 is associated with a success condition, task orchestration system 102 can determine that T_TARGET lies between nodes 602 and 604. Thus, task orchestration system can bound the estimated range for T_TARGET within the times associated with nodes 602 and 604. As the time value corresponding to the success condition can be carried forward as the task processing time, the distance between the nodes can be the error bound with respect to T_TARGET (e.g., the max distance of node 604 from T_TARGET as T_TARGET asymptotically approaches node 602).

FIG. 6B is a timeline chart illustrating an example linear search algorithm for the task schedules introduced above in FIG. 6A. The linear search algorithm can proceed from START at T_MIN. T_MIN can be selected to be a lower bound on an expected range of T_ACTUAL. Failure condition(s) can be expected at START if T_MIN is coarsely estimated to be lower than T_TARGET. (If no failure condition is detected, then task orchestration system 102 can determine that T_MIN likely follows T_TARGET.) The search algorithm can proceed by sequentially testing later batch times. If a failure condition is detected, then task orchestration system 102 can determine that T_TARGET has likely not yet occurred and proceed to the next node. If a success condition is detected, then task orchestration system can determine that T_TARGET has likely occurred.

For example, in FIG. 6B, after a penultimate test time at node 602, a batch succeeds at the test time of node 604. As such, the range bounding T_TARGET can be estimated using the test time at node 602 and the test time at node 604 as lower and upper bounds, respectively.

Once a test time is determined that satisfies the success condition, task orchestration system 102 can resubmit any failed tasks for processing on or after the determined successful test time.

Starting from T_MIN can facilitate rapid estimation of T_TARGET, because each test time in the sequence can be tested in a single pass. For instance, if T_TARGET is 12:30:00 UTC and each node has a test time on the hour and separated by an hour, then task orchestration system 102 can initiate batches at 04:00:00 UTC, 05:00:00 UTC, 06:00:00 UTC, . . . , until a success condition is determined at 13:00:00 UTC. In a single pass, then, task orchestration system can determine that T_TARGET lies between 12:00:00 UTC and 13:00:00 UTC.

Starting from T_MIN can cause task orchestration system 102 to encounter multiple failure conditions. To distribute the failed task events across multiple accounts, task orchestration system 102 can sample disjoint test batches for each different test time. In this manner, for instance, any penalties associated with task failure on the accounts can be mitigated.

FIG. 6C is a timeline chart illustrating another example linear search algorithm for the task schedules introduced above in FIG. 6A. The linear search algorithm can proceed from START at T_MAX. Because T_MAX can be selected to be an upper bound on an expected range of T_TARGET, success can be expected at START. The search algorithm can proceed by sequentially testing earlier batch times until, after a penultimate test time of node 604, a batch fails at the test time of node 602. As such, the range bounding T_TARGET can be estimated using the test time of node 602 and the test time of node 604 as lower and upper bounds, respectively.

As compared to the forward-time search of FIG. 6B, the reverse-time search of FIG. 6C can experience fewer failure conditions on a per-batch basis.

However, the reverse-time search can use multiple passes through the timeline in order to test each next earlier test time. For instance, if T_TARGET is 12:30:00 UTC and each node has a test time on the hour and separated by an hour, then task orchestration system 102 can initiate a batch at 18:00:00 UTC on a first day. On a second day, task orchestration system 102 can initiate a batch at 17:00:00 UTC. And so on, until the failure condition is detected on a final day when a test time of 12:00:00 UTC is evaluated. Accordingly, task orchestration system can determine that T_TARGET lies between 12:00:00 UTC and 13:00:00 UTC with fewer failure conditions but over multiple cycles.

As such, the reverse-time search can accumulate failed task counts over multiple cycles, even if the batches satisfy a success condition. For instance, if a success rate of 60% is a baseline, then main batches executed at the baseline can still have about 40% failures and be considered to satisfy the success condition.

Depending on the size of the main and test batches, the accumulated count of failures with suboptimal task processing times can add up over multiple cycles to be greater than an accumulated count of failures with small test batches failing due to execution before T_TARGET.

Accordingly, task orchestration system 102 can decrease a total failure count by comparing an expected total failure count for one or more different search algorithms and selecting an algorithm with a lower failure count.

Some linear search algorithms can achieve a relatively high precision estimate (e.g., narrowly bounded range) using a relatively large quantity of test times (e.g., decreasing distance between test times for a given T_MIN and T_MAX). However, in some cases, a search can be performed with fewer cycles and fewer failures by skipping some of the time steps (e.g., to avoid at least a portion of the processing time to step through each of such granular nodes).

Figure 7A:
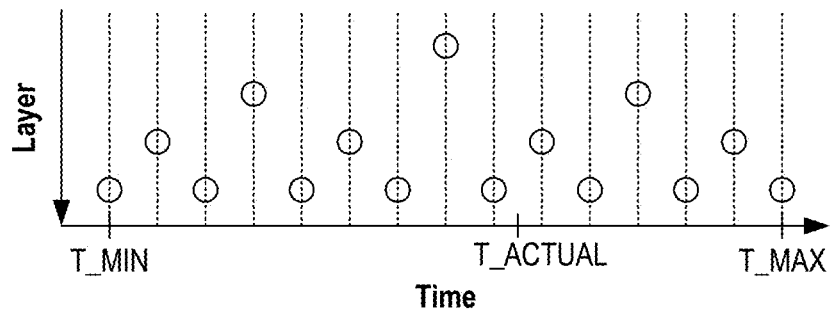
FIG. 7A is a two-dimensional timeline chart that uses the same horizontal spacing between nodes as FIG. 6A for the sake of illustration according to some implementations of the present disclosure.

FIG. 7A is a two-dimensional timeline chart that uses the same horizontal spacing between nodes as FIG. 6A for the sake of illustration. FIG. 7A illustrates that the horizontal spacing of the test times of FIG. 7A can be maintained while dividing the test times into multiple layers. In this manner, for instance, the temporal precision of the set of test times can be maintained (e.g., the minimum time between any two nodes of the timeline chart or graph). Furthermore, when viewed in layers, the test times can be realized as nodes of a tree structure or graph. As such, various graph-based search algorithms can be leveraged to efficiently estimate T_TARGET.

Figure 7B:
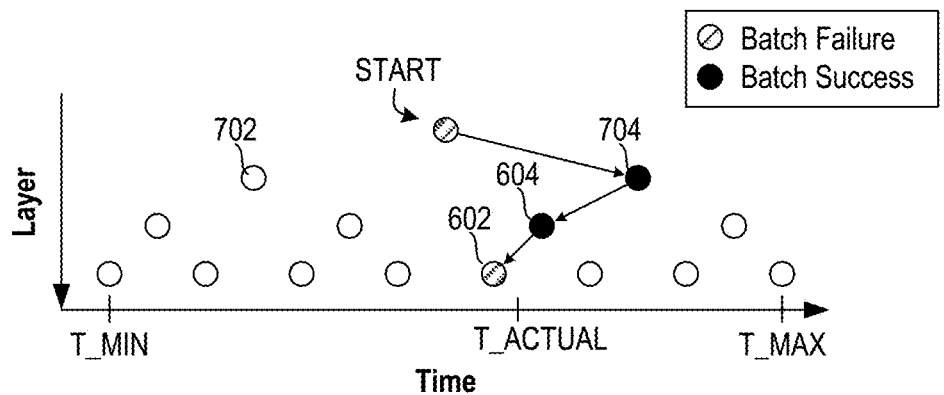
FIG. 7B is a two-dimensional timeline chart illustrating an example tree search algorithm according to some implementations of the present disclosure.

FIG. 7B is a two-dimensional timeline chart illustrating an example tree search algorithm for estimating T_TARGET. The search algorithm can proceed from START at the root of the graph (e.g., a top or $0^{th}$ layer). After evaluating the test time at START, the algorithm can proceed to the next layer. The second layer of graph nodes provides two options for progression: a test time at node 702 preceding START and a test time at node 704 after START. Based on determining a failure condition at START, it can be estimated that T_TARGET lies within a range bounded by START and T_MAX, so the algorithm can proceed to a test time of node 704.

Based on determining a success condition at the test time of node 704, it can be estimated that T_TARGET lies within a range bounded by START and node 704, so the algorithm can proceed to the test time of node 604, which lies between START and node 704. Based on determining a success condition at the test time of node 604, it can be estimated that T_TARGET lies within a range bounded by START and node 604, so the algorithm can proceed to the test time of node 602, which lies between START and node 604. Based on determining a failure condition at the test time of node 602, it can be estimated that T_TARGET lies within a range bounded by node 602 and node 604. As this is the final layer, the output estimate can be the same as obtained in the algorithm(s) of FIGS. 6B and 6C.

The tree search algorithm of FIG. 7B can reach the same estimate with the same precision as the linear search algorithms of FIGS. 6B and 6C. However, the tree search algorithm experienced fewer batch failure conditions than the example linear algorithm in FIG. 6B and used fewer reverse-time steps (thus using fewer cycles) than the example linear algorithm in FIG. 6C.

The tree for the tree search can be a binary search tree (BST). For instance, nodes on the tree can be constructed such that left and right children of a given node respectively correspond to earlier and later test times as compared to the given node.

Advantageously, BST-based searches can provide a bounded number of hops or processing cycles as compared to linear searches. For instance, the linear searches of FIGS. 6B and 6C can need as many as 14 cycles to traverse the search domain defined in FIG. 6A, which contains 14 test times beyond T_MAX. As precision increases, the number of cycles can increase linearly. In contrast, BST-based searches can have a number of hops bounded by a height of the tree. The height of a binary search tree can be expressed, in some cases, as $$h_{tree} = \text{floor}(\log_2(N_{test}+1))$$

where $N_{test}$ indicates the number of test times within the search domain, with $$N_{test} = \frac{T_{MAX} - T_{MIN}}{\Delta T}$$

where $\Delta T$ is the spacing between test times in the search domain and $h_{tree}$ is indexed with the root being the $0^{th}$ layer of the tree. Since searching using the $0^{th}$ layer, the root, consumes at least part of a cycle, the maximum number of cycles can be expressed as follows.

$$N_{cycles} = h_{tree} + 1$$

Advantageously, $N_{cycles}$ can increase sublinearly with $N_{test}$.

The tree can be parameterized with one or more parameters, such as the height of a tree, a number of nodes, a distance between nodes, etc. Although the examples in FIGS. 6A-7B are illustrated with even spacing between nodes, it is to be understood that the nodes can be arbitrarily distributed on the timeline. For example, a coarse or prior estimate of T_TARGET can inform the distribution of nodes. For instance, a greater density of times can be concentrated in a region in which T_TARGET is expected to be, with fewer test nodes farther away from the expected region. In this manner, for instance, greater precision can be achieved with fewer hops in the tree.

The tree construction can be informed by a population of tasks in task queue 104. For instance, a number of tasks in task queue 104 can limit the precision of the tree or limit the range of T_MIN to T_MAX that the tree can span. For instance, a number of possible nodes can be determined by dividing the population of tasks in task queue 104 by a minimum test batch size.

Task orchestration system 102 can estimate T_TARGET periodically to confirm prior estimates. Prior estimates can be used to bias the search to focus on an expected region to decrease a failure count associated with the search.

One or more parameters of the search algorithm (e.g., a linear search, a tree search) can be learnable parameters. A machine learning training loop can be implemented to update the learnable parameters. For instance, over one or more searches for T_TARGET, the learnable parameters can be updated to optimize an objective (e.g., decrease a total failure count). In this manner, for instance, task orchestration system 102 can learn search for T_TARGET with fewer failed tasks.

Task orchestration system 102 can apply other optimization algorithms to optimize task schedule(s) 106 based on various objectives. For example, with a discrete set of candidate task processing times, task orchestration system 102 can apply a machine learning optimization scheme to balance exploitation of known "safe" task processing times to achieve sufficient success rates and exploration of earlier task processing times to identify possibly better success rates (e.g., a "Bernoulli Bandit" approach). In general, such approaches can iteratively estimate a probability of success for each of a set of candidate options, select an option for execution, and learn from the outcome to better estimate the probabilities of success for the next iteration. For example, the "learned" values in such an implementation can be the probability values used to select processing times from the discrete set of candidate processing times. In some cases, the "learned" values can include parameters of a machine-learned model used to select a candidate processing time based on some input context(s).

In general, other reinforcement learning schemes can be applied. For instance, a reinforcement learning algorithm can use a success rate to determine a reward to steer task orchestration system 102 (as the agent) to optimize the reward.

In general, various different search algorithms can be used to decrease a total failure count. For instance, failed tasks can be associated with a cost or penalty. Tasks can fail on a main processing schedule due to, for instance, suboptimal timing of the main processing schedule. Tasks can fail on a test processing schedule due to, for instance, exploration of a timeline that overshoots the actual prerequisite processing time (e.g., submits tasks for processing at a time earlier than the actual prerequisite processing time).

Some search algorithms can leverage a higher risk or higher count of failed tasks while searching to resolve the desired estimate of T_TARGET more quickly. In this manner, for instance, T_TARGET can be estimated in fewer iterations of the main batch. Accordingly, depending on the respective sizes of the test batch(es) and the main batch(es), such algorithms can achieve a lower or a higher net failure count. For example, an example configuration can use test batches that are small with respect to the main batch. In this manner, for instance, multiple failed test batches can remain smaller than a proportion of the main batch. For example, if optimizing a timing of the main batch can achieve a 10% success rate improvement over the entire main batch, then an amount of failures in the test batches totaling less than 10% of the main batch can net a positive benefit.

The benefits of optimizing the main processing schedule sooner rather than later can accrue over time, as each cycle's improvement to the main processing schedule can result in a success rate scaled across the entire main batch. As such, example search algorithms according to the present disclosure can be selected to optimize for a total failure count over one or multiple iterations.

The percentage improvement of the success rate might not be known a priori. A task orchestration system can predict an expected success rate improvement and use the expected success rate improvement to evaluate search algorithms for net expected failure counts. The expected success rate can be predicted using a machine-learned model that was trained over historical data indicating prior success rates or success rate improvements.

In an example, a baseline success rate for a main batch at T_MAX can be 50%. An expected improvement from optimization of the main batch schedule can be 10% (e.g., to bring the success rate over the main batch to 60%). For the following examples, consider a test batch size of 30.

With reference to FIG. 6B, there can be nine failed test batches before finding success with batch 604. This would correspond to at most 270 failed tasks in those failed test batches, with 50% of those being excess failures (135). Thus, the excess failure cost of determining the improved processing time is 135 failures. Each of the test batches can be submitted in series for the same processing cycle (e.g., on the same day prior to that day's main batch processing). With low-latency feedback from remote computing system 110, task orchestration system 102 can, in real-time or substantially real-time, determine the success state of batch 604 and submit the main batch shortly thereafter. In this manner, for instance, the main batch can enjoy the benefit of the newly estimated prerequisite processing time (and the updated success rate of 60%). The test batch failures can be rolled into the main batch for processing, so the main batch population can remain constant for purposes of estimation.

For example, for a main batch population of 100,000, the main batch failures can be only 40,000 instead of 50,000. Assuming worst-case that the test batches failed completely (0% success), then the excess failure rate would be 50% as compared to the baseline. Thus the net change in failures would be an immediate improvement of |10,000−135|=9865. Each cycle thereafter would expect an improvement of 10,000.

However, for a main batch population of 1,000, the net change in failures would be a net loss of |100−135|=35 in the first cycle. After the second cycle, the net change would be positive. Notably, for smaller percentage improvements, or for greater numbers of failed test batches, the breakeven horizon could be much longer.

Table 1 summarizes the example results.

TABLE 1

Example Metrics for Forward Linear Search with low-latency feedback.

| | Test Batch Success rate | Main Batch Success Rate | Approx. cumulative net decrease in failure count for Main Population of 100,000 | Approx. cumulative net decrease in failure count for Main Population of 1000 |
|---|---|---|---|---|
| Cycle 1 | 0% over 9 batches | 60% | 9865 | −35 |
| Cycle 2 | — | 60% | 9865 + 10,000 = 19,865 | 65 |
| . . . | . . . | . . . | . . . | . . . |
| Cycle 6 | — | 60% | 59,865 | 465 |

If feedback from remote computing system 110 is higher latency, task orchestration system 102 might not obtain feedback in time to compute, in real-time or substantially real-time, the success state of batch 604 and submit the main batch shortly thereafter. In such a scenario, for example, at least one main batch could be submitted at T_MAX (the baseline) as the new estimated prerequisite processing time would not yet be known. Table 2 summarizes the example results for this scenario.

TABLE 2

Example Metrics for Forward Linear Search with higher-latency feedback.

| | Test Batch Success rate | Main Batch Success Rate | Approx. cumulative net decrease in failure count for Main Population of 100,000 | Approx. cumulative net decrease in failure count for Main Population of 1000 |
|---|---|---|---|---|
| Cycle 1 | 0% over 9 batches | 50% | −135 | −135 |
| Cycle 2 | — | 60% | 9865 | −35 |
| . . . | . . . | . . . | . . . | . . . |
| Cycle 6 | — | 60% | 49,865 | 365 |

With reference to FIG. 6C, there can be as few as 6 test batch executions over 6 processing cycles (although the search is illustrated as beginning at T_MAX, it can begin at the next earlier time). For each cycle, the main batch can be submitted at each earlier known successful time. For the sake of example, consider a stepwise improvement of 2% for each step. Table 3 summarizes the results for this example.

TABLE 3

Example Metrics for Reverse Linear Search.

| | Test Batch Success rate | Main Batch Success Rate | Approx. cumulative net decrease in failure count for Main Population of 100,000 | Approx. cumulative net decrease in failure count for Main Population of 1000 |
|---|---|---|---|---|
| Cycle 1 | 52% | 52% | 2000 | 20 |
| Cycle 2 | 54% | 54% | 2000 + 4000 = 6000 | 60 |
| Cycle 3 | 56% | 56% | 6000 + 6000 = 12,000 | 120 |
| Cycle 4 | 58% | 58% | 12,000 + 8000 = 20,000 | 200 |
| Cycle 5 | 60% | 60% | 20,000 + 10,000 = 30,000 | 300 |
| Cycle 6 | 0%* worst case | 60% | 30,000 + 10,000 = 40,000 | 400 |

Notably, however, the reverse linear search of FIG. 6C—while resulting in less of an improvement than the forward linear search of FIG. 6B—can achieve improvement with fewer induced failures (e.g., failures resulting from the search itself). For example, the only induced failures occur in the single failed test batch of Cycle 7. In contrast, the failure of all 9 test batches in the forward linear search can contain induced failures.

In some implementations, the reverse linear search of FIG. 6C can guarantee a minimum of induced failures. For instance, because the stopping condition of the reverse linear search is a single failed test, induced failures can be capped to those in a single test batch.

In some scenarios, induced failures can be more costly than latent failures (e.g., failures that would be expected due to external circumstances). Induced failures can be associated with higher penalties. In some scenarios, a search algorithm can be optimized to reduce a number of induced failures.

Tasks which fail in test batches can be re-processed (or submitted for re-processing) at a later time. For instance, tasks which fail in test batches can be added to a main batch to be submitted at a known good time. In some environments, however, there can be rate restrictions on task submission. For instance, a task can be restricted from submission multiple times in a cycle, multiple times in a day, multiple times in an hour, etc. In such systems, induced failures can be even more costly, as failed tasks may experience longer delays before processing.

Furthermore, the reverse linear search of FIG. 6C can achieve better performance than the higher-latency forward linear search, since the reverse linear search can benefit from each new update from each cycle, whereas the forward linear search only obtains a new, better time after all cycle(s) are complete.

A hybrid reverse-forward linear search can be used to meld the advantages of each. For example, coarse reverse linear search can explore and find a suitable T_MIN used for a more precise or granular forward linear search. Otherwise, naively selecting a T_MIN can result in excess induced test batch failures if T_MIN is estimated too low. Similarly, a coarse forward linear search can provide an initial, rapid improvement over T_MAX, and a more precise or granular reverse linear search can subsequently refine the estimate of the prerequisite processing time with low cost.

Another approach that implements multidirectional, increasing precision searches includes tree-based search approaches, such as the search tree approach described herein (e.g., with respect to FIGS. 7A and 7B).

For example, with reference to FIG. 7B, using the example illustrated binary search tee approach, there can be 4 test batch executions over 3 processing cycles (e.g., with the forward hop from START to 704 potentially occurring on the same cycle). Table 4 summarizes the results for this example scenario.

TABLE 4

Example Metrics for BST Search.

| | Test Batch Success rate | Main Batch Success Rate | Approx. cumulative net decrease in failure count for Main Population of 100,000 | Approx. cumulative net decrease in failure count for Main Population of 1000 |
|---|---|---|---|---|
| Cycle 1 | 1@0%, 1@56% | 56% | 6000 − 15 = 5985 | 60 − 15 = 45 |
| Cycle 2 | 60% | 60% | 15,985 | 145 |
| Cycle 3 | 0% | 60% | 25,985 | 245 |
| Cycle 4 | | 60% | 35,985 | 345 |
| Cycle 5 | | 60% | 45,985 | 445 |
| Cycle 6 | | 60% | 55,985 | 545 |

As illustrated herein, for a given precision (e.g., number of and spacing of test batches) example implementations of BST-based searches can provide for greater improvements with fewer induced failures over some other techniques. For example, for the larger batch size, example forward linear search configurations can achieve higher cumulative improvement, but potentially at the cost of more induced failures. Example reverse linear search configurations can guarantee bounded induced failures (and their corresponding penalties), but potentially at the cost of a higher total number of failures (and their corresponding penalties).

Advantages between BST-based approaches and linear approaches can be increasingly pronounced as precision (and thus test times/cycles) increases. For instance, as noted above, a maximum number of cycles for BST-based searches can increase sublinearly with number of test times, while a maximum number of cycles for linear searches can increase linearly with number of test times. Thus, the potential number of failed test batches (e.g., for forward linear) or the number of suboptimal main batches (e.g., for reverse linear) can be significantly higher than for a BST-based approach for the same precision.

Selecting among various search algorithms can be a task submitted to an optimization system. An optimization system can receive input data describing a population size, a test batch size, a desired precision, an expected improvement, etc. and evaluate potential costs associated with various different search approaches. The optimization system can select a search approach that is customized for the particular input data. Task orchestration system 102 can execute the selected search approach.

Figure 8:
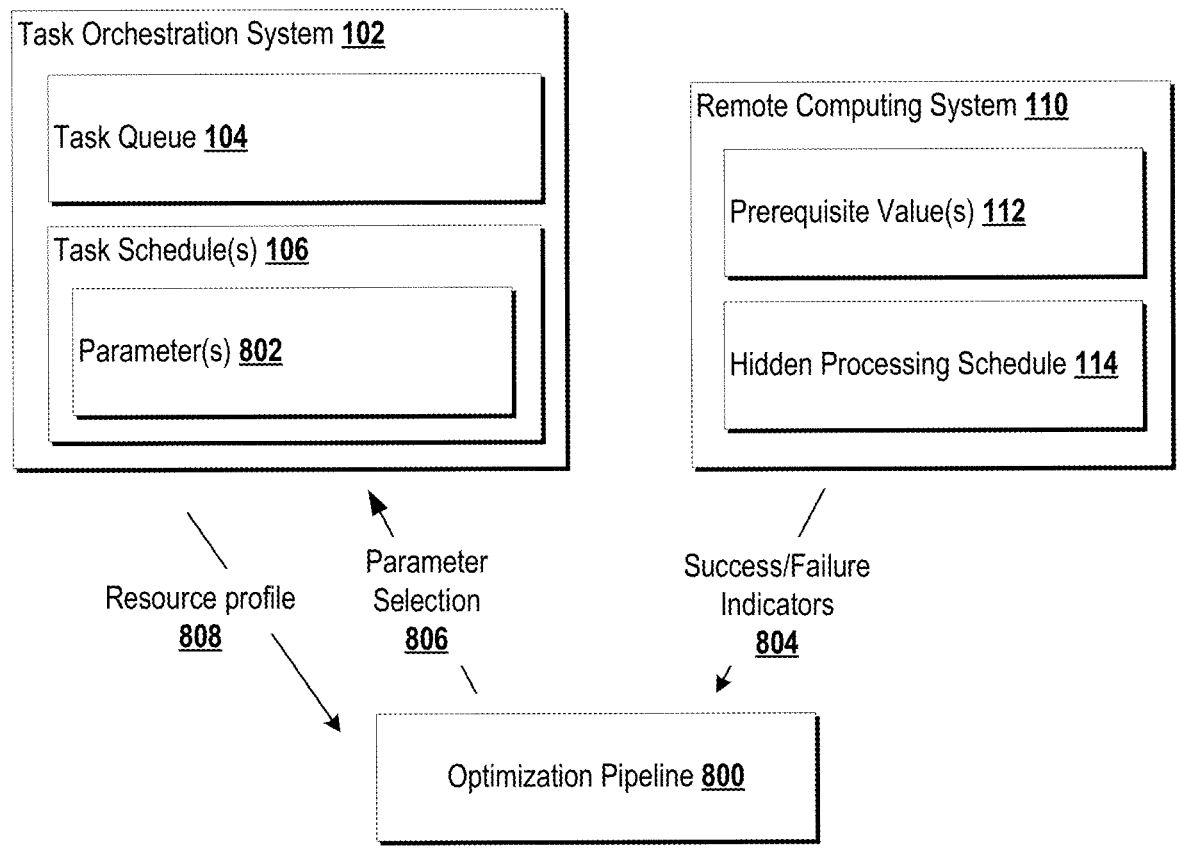
FIG. 8 is a block diagram of an example implementation of task orchestration system according to some implementations of the present disclosure.

FIG. 8 is a block diagram of an example implementation of task orchestration system 102 in which task schedule(s) 106 can be selected or generated using an optimization pipeline 800. For instance, task schedule(s) 106 can be parameterized using one or more parameters 802. Optimization pipeline 800 can process one or more success/failure indicators 804 associated with tasks scheduled according to parameter(s) 802. Success/failure indicator(s) 804 can include, for instance, messages such as failure indicator(s) 126, 144, 334, 434 or success indicator(s) 136, 324, 334, 426, etc. Optimization pipeline 800 can determine parameter selection(s) 806 based on an optimization target. Optimization pipeline 800 can determine parameter selection(s) based on a resource profile 808 that describes an availability of resources for an account (e.g., or an estimated availability thereof).

Optimization pipeline 800 can select or update parameters 802 based on an evaluation of an objective. The objective can be a reward or penalty. Optimization pipeline 800 can process one or more inputs (e.g., success/failure indicators 804, resource profile 808, etc.) to determine parameter selection 806.

Parameters 802 can characterize one or more aspects of task schedule(s) 106. Parameters 802 can include task processing times (e.g., absolute times, relative times).

Parameters 802 can describe how a job or desired operations requested by a client system are divided into discrete tasks. For instance, a job can be configured to consume or use a total quantity of resources. Task orchestration system 102 can subdivide the job into tasks that individually consume or uses a smaller quantity of resources. Increasing a number of tasks can decrease the resource usage of each task. Parameters 802 can indicate, for example, a number of tasks, a number of tasks per temporal unit (e.g., tasks per month, tasks per week, tasks per day, etc.). Parameters 802 can indicate an amount of resources per task (e.g., tasks within a job can vary in resource utilization).

Parameter selection 806 can include selections of candidate options for parameters 802. Candidate options can be predetermined based on one or more initial configurations of task orchestration system 102. Parameter selection 806 can include updates to values of parameters 802. For instance, updates can be generated using one or more optimization algorithms in a machine-learning training loop.

Task orchestration system 102 can optimize task schedule(s) 106 to improve a management of resources used by task(s). For example, task orchestration system can estimate a resource profile 808 that describes an availability of resources for a particular account and optimize a task processing schedule for tasks for that account to optimize one or more characteristics of an expected resource profile.

Figure 9:
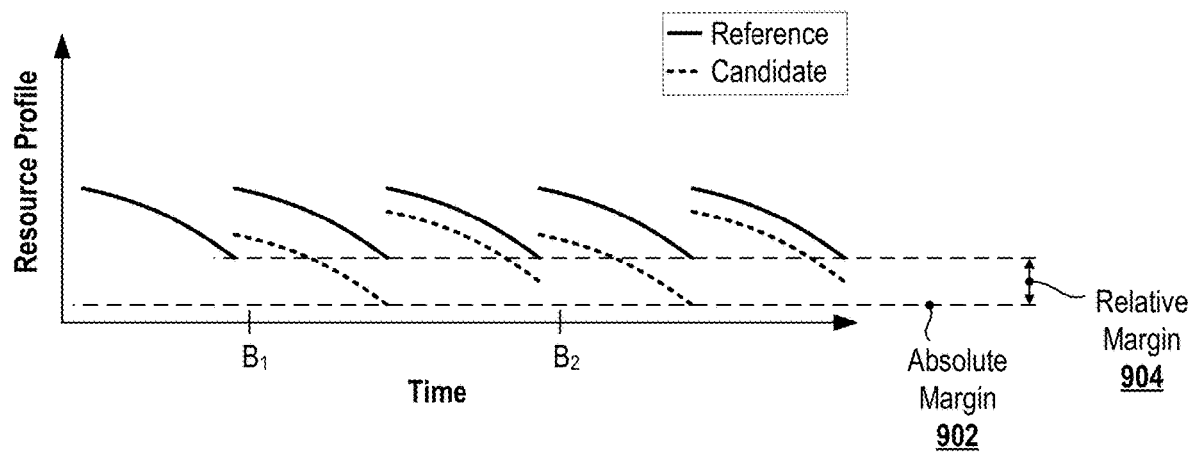
FIG. 9 is an example timeline chart depicting an example resource profile according to some implementations of the present disclosure.

FIG. 9 is an example timeline chart depicting an example resource profile. A reference resource profile can be predicted by task orchestration system 102 as a baseline. One or more candidate resource profiles can be generated to provide an estimate of how a particular task processing schedule will affect a shape of the resource profile.

For instance, FIG. 9 illustrates processing a job in two batches, B1 and B2. A resource utilization metric can be computed to describe an effect of the batch processing on the resource profile. An absolute margin 902 can indicate a distance from zero, or the minimum reserve or buffer of resources associated with the account if the two-batch task schedule is implemented. A relative margin 904 can indicate a change in the distance from zero, or an estimate of how much the margin changes due to applying the two-batch task schedule.

Figure 10:
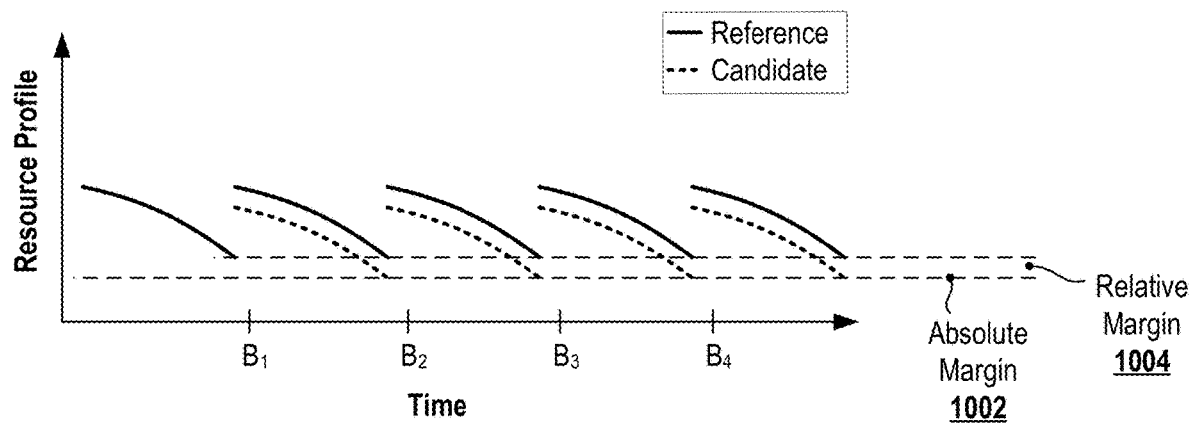
FIG. 10 is an example timeline chart depicting an example resource profile according to some implementations of the present disclosure.

FIG. 10 illustrates processing the same job in four batches: B1, B2, B3, and B4. In FIG. 10, the absolute margin 1002 can be higher, because the individual tasks use fewer resources. The relative margin 1004 can be lower, because the change introduced by the schedule is lower magnitude.

Other utilization metrics can be used. In general, such metrics can evaluate various characteristics of changes to a resource profile introduced by task processing. In this manner, for instance, a utilization metric can be used to select task schedule parameters that optimize for a resource profile that increases a success rate of tasks submitted for processing using those resources. A utilization metric can be used to select task schedule parameters that optimize for maximizing an absolute margin or minimizing a relative margin.

Figure 11:
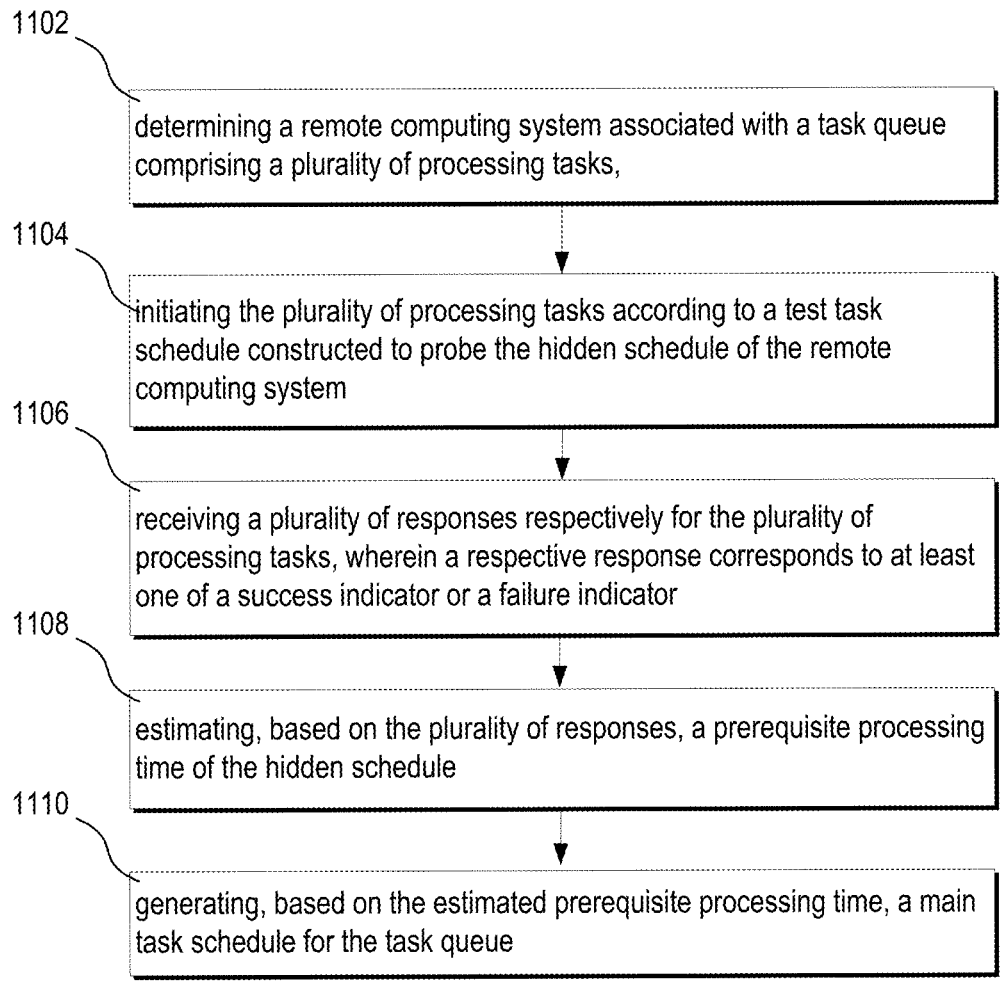
FIG. 11 is a flowchart of an example method for monitoring upstream computations according to some implementations of the present disclosure.

FIG. 11 depicts a flowchart of an example method 1100 for monitoring upstream computations according to aspects of the present disclosure. One or more portion(s) of the example method 1100 can be implemented by a computing system that includes one or more computing devices such as, for example, the computing systems described with reference to the other figures. Each respective portion of the example method 1100 can be performed by any (or any combination) of one or more computing devices. Moreover, one or more portion(s) of the example method 1100 can be implemented on the hardware components of the device(s) described herein.

FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of example method 1100 can be performed additionally, or alternatively, by other systems.

At 1102, example method 1100 can include determining a remote computing system associated with a task queue comprising a plurality of processing tasks. Example method 1100 can be implemented by a computing system, such as task orchestration system 102. The remote computing system can be, for instance, remote computing system 110. The remote computing system can be determined based on an association between the remote computing system and one or more of the plurality of processing tasks.

The remote computing system can update, based on a hidden schedule (e.g., hidden schedule 114), prerequisites for the plurality of processing tasks. For example, task prerequisites (e.g., task prerequisites 112) can include events or account statuses that are generally required for successful task processing. For instance, resource availability can be a prerequisite to executing tasks that use the resources. For instance, a task that requires a specified amount of a resource (e.g., number of GPU hours, amount of financial resources) can fail if the specified amount of resource is not currently available in association with an account associated with the task.

At 1104, example method 1100 can include initiating the plurality of processing tasks according to a test task schedule constructed to probe the hidden schedule of the remote computing system. A test task schedule can include a test task schedule 306-2, 406-2, etc.

At 1106, example method 1100 can include receiving a plurality of responses respectively for the plurality of processing tasks. A respective response can correspond to at least one of a success indicator (e.g., indicator(s) 136, 324, 334, 426, etc.) or a failure indicator (e.g., 126, 144, 434, etc.).

At 1108, example method 1100 can include estimating, based on the plurality of responses, a prerequisite processing time of the hidden schedule. For instance, an actual prerequisite processing time T_TARGET might be unknown. A task orchestration system can explore a range of T_MIN to T_MAX to estimate a value of T_TARGET.

At 1110, example method 1100 can include generating, based on the estimated prerequisite processing time, a main task schedule for the task queue. The main task schedule can be, for instance, main task schedule 306-1, 406-1, etc.

In some implementations of example method 1100, initiating the plurality of processing tasks can include generating one or more test batches including one or more processing tasks (e.g., test batches 304-2, 404-2, etc.). In some implementations of example method 1100, initiating the plurality of processing tasks can include associating each test batch of the one or more test batches with a corresponding batch time for initiating the test batch. In some implementations of example method 1100, initiating the plurality of processing tasks can include submitting, to the remote computing system, one or more of the test batches to be processed at the respectively corresponding batch times.

In some implementations of example method 1100, the corresponding batch time can be a relative batch time determined with respect to a reference time associated with the one or more processing tasks in the respective test batch.

In some implementations of example method 1100, estimating the prerequisite processing time can include determining a first value of the test task schedule that is associated with a failure condition. In some implementations of example method 1100, estimating the prerequisite processing time can include determining a second value of the test task schedule that is associated with a success condition. In some implementations of example method 1100, estimating the prerequisite processing time can include estimating the prerequisite processing time to be within an interval with a lower bound value based on the first value and an upper bound value based on the second value.

In some implementations of example method 1100, the test task schedule can be constructed to form a binary search tree of task processing times.

In some implementations, example method 1100 can include, for a respective iteration of a plurality of iterations, initiating a respective batch of processing tasks at a respective batch time associated with a respective node of the binary search tree. In some implementations, example method 1100 can include, for the respective iteration, determining, based on evaluating one or more responses received for the respective batch, a next respective batch time associated with a next respective node of the binary search tree. The next respective node can be a child of the respective node. In some implementations, example method 1100 can include, for the respective iteration, updating at least one of the lower bound value and the upper bound value to be the respective batch time. In some implementations, example method 1100 can include, for the respective iteration, initiating a next respective batch of client processing tasks at the next respective batch time.

In some implementations of example method 1100, determining the next respective batch time can include, based on determining a failure condition for the respective batch, assigning a later child node of the respective node as the next respective node. The next respective batch time can be a time associated with the later child node. In some implementations of example method 1100, determining the next respective batch time can include, based on determining a success condition for the respective batch, assigning an earlier child node of the respective node as the next respective node. The next respective batch time can be a time associated with the earlier child node.

In some implementations of example method 1100, the binary search tree can be characterized by a temporal precision defining a minimum node distance.

In some implementations of example method 1100, receiving the plurality of responses can include receiving, from the remote computing system, results for a respective test batch submitted at a respective batch time. In some implementations of example method 1100, receiving the plurality of responses can include determining, based on the results for the respective test batch, a score associated with a likelihood that the prerequisites of the client processing tasks in the respective test batch were updated before the batch time. In some implementations of example method 1100, receiving the plurality of responses can include at least one of: determining, based on the score being above a threshold value, that the prerequisite processing time preceded the respective batch time; or determining, based on the score being below a threshold value, that the respective batch time preceded the prerequisite processing time.

In some implementations of example method 1100, example method 1100 can include initiating a main batch of the plurality of processing tasks at a main task time that is determined based on the upper bound value.

In some implementations of example method 1100, example method 1100 can include, for one or more iterations, until a stopping condition, a series of operations. The series of operations can include initiating a respective plurality of processing tasks according to a respective task schedule constructed to probe the hidden schedule of the remote computing system. The series of operations can include receiving a respective plurality of responses respectively for the respective plurality of processing tasks. The series of operations can include estimating, based on a threshold number of success indicators in the respective plurality of responses, a task time for a next respective task schedule for a next iteration, the task time earlier than a preceding task time for a preceding iteration. In some implementations of example method 1100, the stopping condition can be based on a failure to receive the threshold number of success indicators in the respective plurality of responses for a respective iteration.

In some implementations of example method 1100, example method 1100 can include determining that a duration since estimation of the prerequisite processing time exceeds a threshold. In some implementations of example method 1100, example method 1100 can include re-estimating the prerequisite processing time.

In some implementations of example method 1100, re-estimating the prerequisite processing time can search a smaller initial interval.

Figure 12:
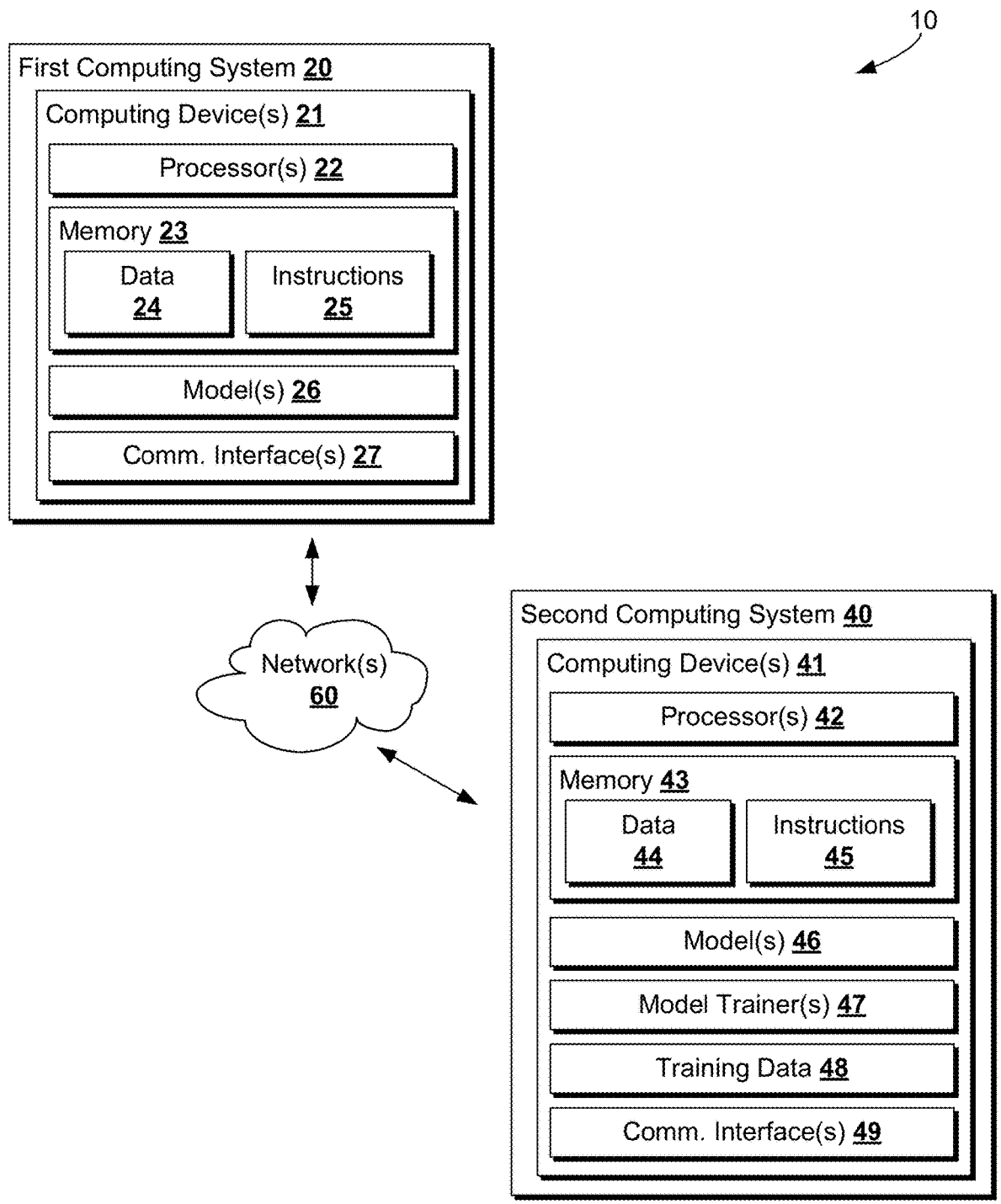
FIG. 12 is a block diagram of an example computing system for monitoring upstream computations according to some implementations of the present disclosure.

FIG. 12 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing system 40 can implement one or more of the systems, operations, or functionalities described herein. For instance, one of first computing system 20 and second computing system 40 can be or implement task orchestration system 102 and the other can be or implement remote computing system 110.

In some implementations, the first computing system 20 can perform the operations and functions as described herein. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include any data or information described herein. In some implementations, the first computing system 20 can obtain data from one or more memory device(s) that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processor(s) 22.

For example, memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein.

In some implementations, the first computing system 20 can store or include one or more models 26. In some implementations, the models 26 can be or can otherwise include one or more machine-learned models (e.g., a machine-learned content generation model, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more transformer models.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in memory 23. The first computing system 20 can then use or otherwise implement the models 26 (e.g., by the processors 22).

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. Memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, memory 43 (e.g., one or more non-transitory computer-readable storage media, memory devices, etc.) can store data 44 that can be obtained. The data 44 can include any data or information described herein. In some implementations, the second computing system 40 can obtain data from one or more memory device(s) that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. Example neural networks include natural language processing models, such as Large Language Models (LLMs) and variants and components thereof. For example, the second computing system 40 can include one or more transformer models.

In some implementations, the second computing system 40 or the first computing system 20 can train one or more machine-learned models of the model(s) 26 or the model(s) 46 through the use of one or more model trainers 47 and training data 48. Training data 48 can include, for instance, example task schedules and success or failure indicators associated therewith. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include synthesized training data. In some implementations, the second computing system 40 can implement data synthesis operations (e.g., masking operations, corrupting operations, etc.) for obtaining the training data 48 or for implementing the model trainer(s) 47 for training or testing the model(s) 26 or the model(s) 46. By way of example, the model trainer(s) 47 can train one or more components of a machine-learned model through unsupervised training techniques using an objective function (e.g., costs, rewards, heuristics, constraints, etc.) based on training data obtained from a corpus of training data. In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 12 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from a computing system can instead be performed at the computing system itself, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A task orchestration system configured to monitor computations of a remote computing system, the task orchestration system comprising:
   one or more processors; and
   one or more non-transitory, computer-readable media storing instructions that are executable by the one or more processors to cause the task orchestration system to perform operations, the operations comprising:
      determining a remote computing system associated with a task queue comprising a plurality of processing tasks, wherein the remote computing system updates, based on a remote computing system schedule, prerequisite resources for the plurality of processing tasks, and wherein the remote computing system schedule is not accessible by the task orchestration system;
      initiating the plurality of processing tasks according to a test task schedule constructed to probe the remote computing system schedule;
      receiving a plurality of responses respectively for the plurality of processing tasks, wherein a respective response corresponds to at least one of a success indicator or a failure indicator;
      estimating, based on the plurality of responses, a prerequisite processing time of the remote computing system schedule, wherein estimating the prerequisite processing time comprises:
         determining a first value of the test task schedule that is associated with a failure condition;
         determining a second value of the test task schedule that is associated with a success condition; and
         estimating the prerequisite processing time to be within an interval with a lower bound value based on the first value and an upper bound value based on the second value; and
      generating, based on the estimated prerequisite processing time, a main task schedule for the task queue.

2. The task orchestration system of claim 1, wherein initiating the plurality of processing tasks comprises:
   generating one or more test batches that each respectively comprise one or more respective processing tasks of the plurality of processing tasks;
   associating each test batch of the one or more test batches with a corresponding batch time for initiating the test batch; and
   submitting, to the remote computing system, one or more of the test batches to be processed at the respectively corresponding batch times.

3. The task orchestration system of claim 2, wherein the corresponding batch time is a relative batch time determined with respect to a reference time associated with the one or more respective processing tasks in the respective test batch.

4. The task orchestration system of claim 1, wherein the test task schedule is constructed to form a binary search tree of task processing times.

5. The task orchestration system of claim 1, wherein the test task schedule is constructed to form a binary search tree of task processing times, and wherein the operations comprise:
   for a respective iteration of a plurality of iterations:
      initiating a respective batch of processing tasks at a respective batch time associated with a respective node of the binary search tree;
      determining, based on evaluating one or more responses received for the respective batch, a next respective batch time associated with a next respective node of the binary search tree, the next respective node being a child of the respective node;
      updating at least one of the lower bound value and the upper bound value to be the respective batch time; and
      initiating a next respective batch of client processing tasks at the next respective batch time.

6. The task orchestration system of claim 5, wherein determining the next respective batch time comprises:
   based on determining a failure condition for the respective batch, assigning a later child node of the respective node as the next respective node, wherein the next respective batch time is a time associated with the later child node; or
   based on determining a success condition for the respective batch, assigning an earlier child node of the respective node as the next respective node, wherein the next respective batch time is a time associated with the earlier child node.

7. The task orchestration system of claim 4, wherein the binary search tree is characterized by a temporal precision defining a minimum node distance.

8. The task orchestration system of claim 5, wherein receiving the plurality of responses comprises:
   receiving, from the remote computing system, results for a respective test batch submitted at a respective batch time;
   determining, based on the results for the respective test batch, a score associated with a likelihood that the prerequisite resources of the client processing tasks in the respective test batch were updated before the batch time; and
   at least one of:
      determining, based on the score being above a threshold value, that the prerequisite processing time preceded the respective batch time; or
      determining, based on the score being below a threshold value, that the respective batch time preceded the prerequisite processing time.

9. The task orchestration system of claim 1, wherein the operations comprise:
   initiating a main batch of the plurality of processing tasks at a main task time that is determined based on the upper bound value.

10. The task orchestration system of claim 1, wherein the operations comprise:
   for one or more iterations, until a stopping condition:
      initiating a respective plurality of processing tasks according to a respective task schedule constructed to probe the remote computing system schedule;
      receiving a respective plurality of responses respectively for the respective plurality of processing tasks; and
      estimating, based on a threshold number of success indicators in the respective plurality of responses, a task time for a next respective task schedule for a next iteration, the task time earlier than a preceding task time for a preceding iteration;
   wherein the stopping condition is based on a failure to receive the threshold number of success indicators in the respective plurality of responses for a respective iteration.

11. The task orchestration system of claim 1, wherein the operations comprise:
   determining that a duration since estimation of the prerequisite processing time exceeds a threshold; and
   re-estimating the prerequisite processing time.

12. The task orchestration system of claim 11, wherein re-estimating the prerequisite processing time searches a smaller initial interval.

13. A computer-implemented method, comprising:
   determining a remote computing system associated with a task queue comprising a plurality of processing tasks, wherein the remote computing system updates, based on a remote computing system schedule, prerequisite resources for the plurality of processing tasks;
   initiating the plurality of processing tasks according to a test task schedule of a task orchestration system, the test task schedule constructed to probe the remote computing system schedule, wherein the remote computing system schedule is not accessible by the task orchestration system;
   receiving a plurality of responses respectively for the plurality of processing tasks, wherein a respective response corresponds to at least one of a success indicator or a failure indicator;
   estimating, based on the plurality of responses, a prerequisite processing time of the remote computing system schedule, wherein estimating the prerequisite processing time comprises:
      determining a first value of the test task schedule that is associated with a failure condition;
      determining a second value of the test task schedule that is associated with a success condition; and
      estimating the prerequisite processing time to be within an interval with a lower bound value based on the first value and an upper bound value based on the second value; and
   generating, based on the estimated prerequisite processing time, a main task schedule for the task queue.

14. The computer-implemented method of claim 13, wherein initiating the plurality of processing tasks comprises:
  generating one or more test batches that each respectively comprise one or more respective processing tasks of the plurality of processing tasks;
  associating each test batch of the one or more test batches with a corresponding batch time for initiating the test batch; and
  submitting, to the remote computing system, one or more of the test batches to be processed at the respectively corresponding batch times;
  wherein the corresponding batch time is a relative batch time determined with respect to a reference time associated with the one or more respective processing tasks in the respective test batch.

15. The computer-implemented method of claim 13, wherein the test task schedule is constructed to form a binary search tree of task processing times.

16. The computer-implemented method of claim 13, comprising:
  for a respective iteration of a plurality of iterations:
    initiating a respective batch of processing tasks at a respective batch time associated with a respective node of a binary search tree formed by the test task schedule;
    determining, based on evaluating one or more responses received for the respective batch, a next respective batch time associated with a next respective node of the binary search tree, the next respective node being a child of the respective node;
    updating at least one of the lower bound value and the upper bound value to be the respective batch time; and
    initiating a next respective batch of client processing tasks at the next respective batch time.

17. The computer-implemented method of claim 16, wherein determining the next respective batch time comprises:
  based on determining a failure condition for the respective batch, assigning a later child node of the respective node as the next respective node, wherein the next respective batch time is a time associated with the later child node; or
  based on determining a success condition for the respective batch, assigning an earlier child node of the respective node as the next respective node, wherein the next respective batch time is a time associated with the earlier child node.

18. One or more non-transitory computer-readable media storing instructions that are executable by one or more processors to cause a computing system to perform operations, the operations comprising:
  determining a remote computing system associated with a task queue comprising a plurality of processing tasks, wherein the remote computing system updates, based on a remote computing system schedule, prerequisite resources for the plurality of processing tasks;
  initiating the plurality of processing tasks according to a test task schedule of a task orchestration system, the test task schedule constructed to probe the remote computing system schedule, wherein the remote computing system schedule is not accessible by the task orchestration system;
  receiving a plurality of responses respectively for the plurality of processing tasks, wherein a respective response corresponds to at least one of a success indicator or a failure indicator;
  estimating, based on the plurality of responses, a prerequisite processing time of the remote computing system schedule, wherein estimating the prerequisite processing time comprises:
    determining a first value of the test task schedule that is associated with a failure condition;
    determining a second value of the test task schedule that is associated with a success condition; and
    estimating the prerequisite processing time to be within an interval with a lower bound value based on the first value and an upper bound value based on the second value; and
  generating, based on the estimated prerequisite processing time, a main task schedule for the task queue.

19. A task orchestration system configured to monitor computations of a remote computing system, the task orchestration system comprising:
  one or more processors; and
  one or more non-transitory, computer-readable media storing instructions that are executable by the one or more processors to cause the task orchestration system to perform operations, the operations comprising:
    determining a remote computing system associated with a task queue comprising a plurality of processing tasks, wherein the remote computing system updates, based on a remote computing system schedule, prerequisite resources for the plurality of processing tasks, and wherein the remote computing system schedule is not accessible by the task orchestration system;
    initiating the plurality of processing tasks according to a test task schedule constructed to probe the remote computing system schedule;
    receiving a plurality of responses respectively for the plurality of processing tasks, wherein a respective response corresponds to at least one of a success indicator or a failure indicator;
    estimating, based on the plurality of responses, a prerequisite processing time of the remote computing system schedule; and
    generating, based on the estimated prerequisite processing time, a main task schedule for the task queue;
  wherein the operations comprise, for one or more iterations, until a stopping condition:
    initiating a respective plurality of processing tasks according to a respective task schedule constructed to probe the remote computing system schedule;
    receiving a respective plurality of responses respectively for the respective plurality of processing tasks; and
    estimating, based on a threshold number of success indicators in the respective plurality of responses, a task time for a next respective task schedule for a next iteration, the task time earlier than a preceding task time for a preceding iteration;
  wherein the stopping condition is based on a failure to receive the threshold number of success indicators in the respective plurality of responses for a respective iteration.

20. A task orchestration system configured to monitor computations of a remote computing system, the task orchestration system comprising:
  one or more processors; and
  one or more non-transitory, computer-readable media storing instructions that are executable by the one or more processors to cause the task orchestration system to perform operations, the operations comprising:

determining a remote computing system associated with a task queue comprising a plurality of processing tasks, wherein the remote computing system updates, based on a remote computing system schedule, prerequisite resources for the plurality of processing tasks, and wherein the remote computing system schedule is not accessible by the task orchestration system;

initiating the plurality of processing tasks according to a test task schedule constructed to probe the remote computing system schedule, wherein the test task schedule is constructed to form a binary search tree of task processing times, wherein initiating the plurality of processing tasks comprises:

generating one or more test batches that each respectively comprise one or more respective processing tasks of the plurality of processing tasks;

associating each test batch of the one or more test batches with a corresponding batch time for initiating the test batch; and submitting, to the remote computing system, one or more of the test batches to be processed at the respectively corresponding batch times;

receiving a plurality of responses respectively for the plurality of processing tasks, wherein a respective response corresponds to at least one of a success indicator or a failure indicator;

estimating, based on the plurality of responses, a prerequisite processing time of the remote computing system schedule; and generating, based on the estimated prerequisite processing time, a main task schedule for the task queue.

21. The task orchestration system of claim 20, wherein the binary search tree is characterized by a temporal precision defining a minimum node distance.

* * * * *